US012490422B2

(12) United States Patent
Aoki et al.

(10) Patent No.: US 12,490,422 B2
(45) Date of Patent: Dec. 2, 2025

(54) SEMICONDUCTOR MEMORY DEVICE

(71) Applicant: Kioxia Corporation, Tokyo (JP)

(72) Inventors: Takeshi Aoki, Ebina Kanagawa (JP); Masaharu Wada, Yokohama Kanagawa (JP); Mamoru Ishizaka, Hiratsuka Kanagawa (JP); Tsuneo Inaba, Kamakura Kanagawa (JP)

(73) Assignee: Kioxia Corporation, Tokyo (JP)

( * ) Notice: Subject to any disclaimer, the term of this patent is extended or adjusted under 35 U.S.C. 154(b) by 733 days.

(21) Appl. No.: 17/841,529

(22) Filed: Jun. 15, 2022

(65) Prior Publication Data

US 2023/0200051 A1    Jun. 22, 2023

(30) Foreign Application Priority Data

Dec. 17, 2021  (JP) ................. 2021-205591

(51) Int. Cl.
  *H10B 12/00*     (2023.01)
  *G11C 11/4091*   (2006.01)
  *H10D 30/67*     (2025.01)

(52) U.S. Cl.
  CPC .......... *H10B 12/30* (2023.02); *G11C 11/4091* (2013.01); *H10B 12/50* (2023.02); *H10D 30/6755* (2025.01)

(58) Field of Classification Search
  CPC .... H10B 12/30; H10B 12/50; H10D 30/6755; G11C 11/4091
  See application file for complete search history.

(56) References Cited

U.S. PATENT DOCUMENTS

| 9,514,792 | B2 | 12/2016 | Kajigaya | |
|---|---|---|---|---|
| 2013/0070506 | A1* | 3/2013 | Kajigaya | H10B 63/845 365/51 |
| 2017/0271341 | A1 | 9/2017 | Tanaka et al. | |
| 2018/0033478 | A1 | 2/2018 | Tanaka et al. | |
| 2018/0082733 | A1 | 3/2018 | Tanaka et al. | |
| 2021/0091108 | A1* | 3/2021 | Naruke | G11C 16/24 |
| 2021/0242210 | A1* | 8/2021 | Lee | G11C 11/4085 |
| 2022/0102358 | A1* | 3/2022 | Park | H10B 12/03 |
| 2022/0285353 | A1* | 9/2022 | Cho | H10B 12/05 |

* cited by examiner

*Primary Examiner* — Britt D Hanley
*Assistant Examiner* — Casey Paul Boatman
(74) *Attorney, Agent, or Firm* — Foley & Lardner LLP

(57) ABSTRACT

A semiconductor memory device comprises a memory cell array. The memory cell array comprises sub arrays. The sub array comprises: memory portions; first semiconductor layers electrically connected to memory portions; first gate electrodes respectively facing first semiconductor layers; a first wiring electrically connected to first semiconductor layers; second wirings connected to first gate electrodes; second semiconductor layers electrically connected to first end portions of second wirings; second gate electrodes facing second semiconductor layers; and a third wiring electrically connected to second semiconductor layers. The memory cell array comprises fourth wirings that extend in one direction across the sub arrays and are connected to second gate electrodes.

23 Claims, 32 Drawing Sheets

SEMICONDUCTOR MEMORY DEVICE

CROSS-REFERENCE TO RELATED APPLICATIONS

This application is based upon and claims the benefit of Japanese Patent Application No. 2021-205591, filed on Dec. 17, 2021, the entire contents of which are incorporated herein by reference.

BACKGROUND

Field

Embodiments relate to a semiconductor memory device.

Description of the Related Art

As degree-of-integration of semiconductor memory devices continues to rise, study is underway into how three-dimensionality of the semiconductor memory devices may be further promoted.

DETAILED DESCRIPTION

Figure 1:
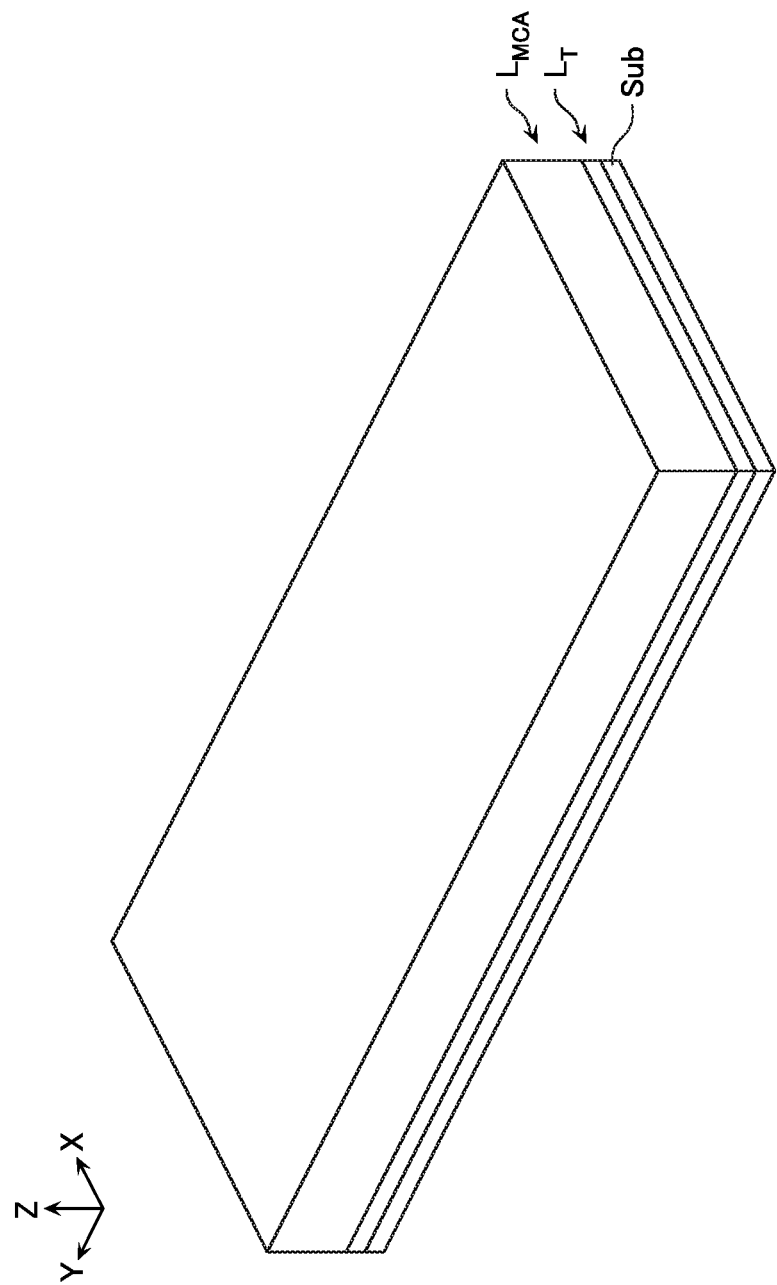
FIG. 1 is a schematic perspective view showing some of configurations of a semiconductor memory device according to a first embodiment.

A semiconductor memory device according to an embodiment comprises a memory cell array. The memory cell array comprises a plurality of sub array columns arranged in a first direction. The plurality of sub array columns each comprise a plurality of sub arrays arranged in a second direction that intersects the first direction. The plurality of sub arrays each comprise a plurality of memory portions, a plurality of first semiconductor layers, a plurality of first gate electrodes, a first wiring, a plurality of second wirings, a plurality of second semiconductor layers, a plurality of second gate electrodes, and a third wiring. The plurality of memory portions are arranged in a third direction that intersects the first and second directions. The plurality of first semiconductor layers are arranged in the third direction and electrically connected to the plurality of memory portions. The plurality of first gate electrodes are arranged in the third direction and respectively face the plurality of first semiconductor layers. The first wiring extends in the third direction and is electrically connected to the plurality of first semiconductor layers. The plurality of second wirings are arranged in the third direction, extend in the first direction, and are connected to the plurality of first gate electrodes. The plurality of second semiconductor layers are arranged in the third direction and electrically connected to first end portions of the plurality of second wirings in the first direction. The plurality of second gate electrodes are arranged in the third direction and face the plurality of second semiconductor layers. The third wiring extends in the third direction and is electrically connected to the plurality of second semiconductor layers. The plurality of sub array columns each comprise a plurality of fourth wirings. The plurality of fourth wirings extend in the second direction across at least two of the plurality of sub arrays arranged in the second direction and are connected to at least two of the plurality of second gate electrodes.

Next, semiconductor memory devices according to embodiments will be described in detail with reference to the drawings. Note that the following embodiments are merely examples, and are not shown with the intention of limiting the present invention. Moreover, the following drawings are schematic, and, for convenience of description, some of configurations, and so on, thereof will sometimes be omitted. Moreover, portions that are common to a plurality of embodiments will be assigned with the same symbols, and descriptions thereof sometimes omitted.

Moreover, when a "semiconductor memory device" is referred to in the present specification, it will sometimes mean a memory die, and will sometimes mean a memory system including a control die, of the likes of a memory chip, a memory card, or an SSD (Solid State Drive). Furthermore, it will sometimes mean a configuration including a host computer, of the likes of a smartphone, a tablet terminal, or a personal computer.

Moreover, in the present specification, when a first configuration is said to be "electrically connected" to a second configuration, the first configuration may be connected to the second configuration directly, or the first configuration may be connected to the second configuration via the likes of a wiring, a semiconductor member, or a transistor. For example, in the case of three transistors having been serially connected, the first transistor is still "electrically connected" to the third transistor even if the second transistor is in an OFF state.

Moreover, in the present specification, a certain direction parallel to an upper surface of a substrate will be called an X direction, a direction parallel to the upper surface of the substrate and perpendicular to the X direction will be called a Y direction, and a direction perpendicular to the upper surface of the substrate will be called a Z direction.

Moreover, in the present specification, sometimes, a direction lying along a certain plane will be called a first direction, a direction intersecting the first direction along this certain plane will be called a second direction, and a direction intersecting this certain plane will be called a third direction. These first direction, second direction, and third direction may correspond to any of the X direction, the Y direction, and the Z direction, but need not do so.

Moreover, in the present specification, expressions such as "up" or "down" will be defined with reference to the substrate. For example, an orientation of moving away from the substrate along the above-described Z direction will be called up, and an orientation of coming closer to the substrate along the Z direction will be called down. Moreover, when a lower surface or a lower end is referred to for a certain configuration, this will be assumed to mean a surface or end portion on a substrate side of this configuration, and when an upper surface or an upper end is referred to for a certain configuration, this will be assumed to mean a surface or end portion on an opposite side to the substrate of this configuration. Moreover, a surface intersecting the X direction or the Y direction will be called a side surface, and so on.

First Embodiment

[Configuration]

FIG. 1 is a schematic perspective view showing some of configurations of a semiconductor memory device according to a first embodiment. The semiconductor memory device according to the present embodiment comprises: a semiconductor substrate Sub; a memory cell array layer $L_{MCA}$ provided above the semiconductor substrate Sub; and a transistor layer $L_T$ provided between the semiconductor substrate Sub and memory cell array layer $L_{MCA}$. These configurations will be described in order below.

[Semiconductor Substrate Sub]

The semiconductor substrate Sub is a semiconductor substrate of the likes of silicon (Si) including a P type impurity such as boron (B), for example. A part of a peripheral circuit controlling configurations in the memory cell array layer $L_{MCA}$ may be provided on an upper surface of the semiconductor substrate Sub.

[Memory Cell Array Layer $L_{MCA}$]

Figure 2:
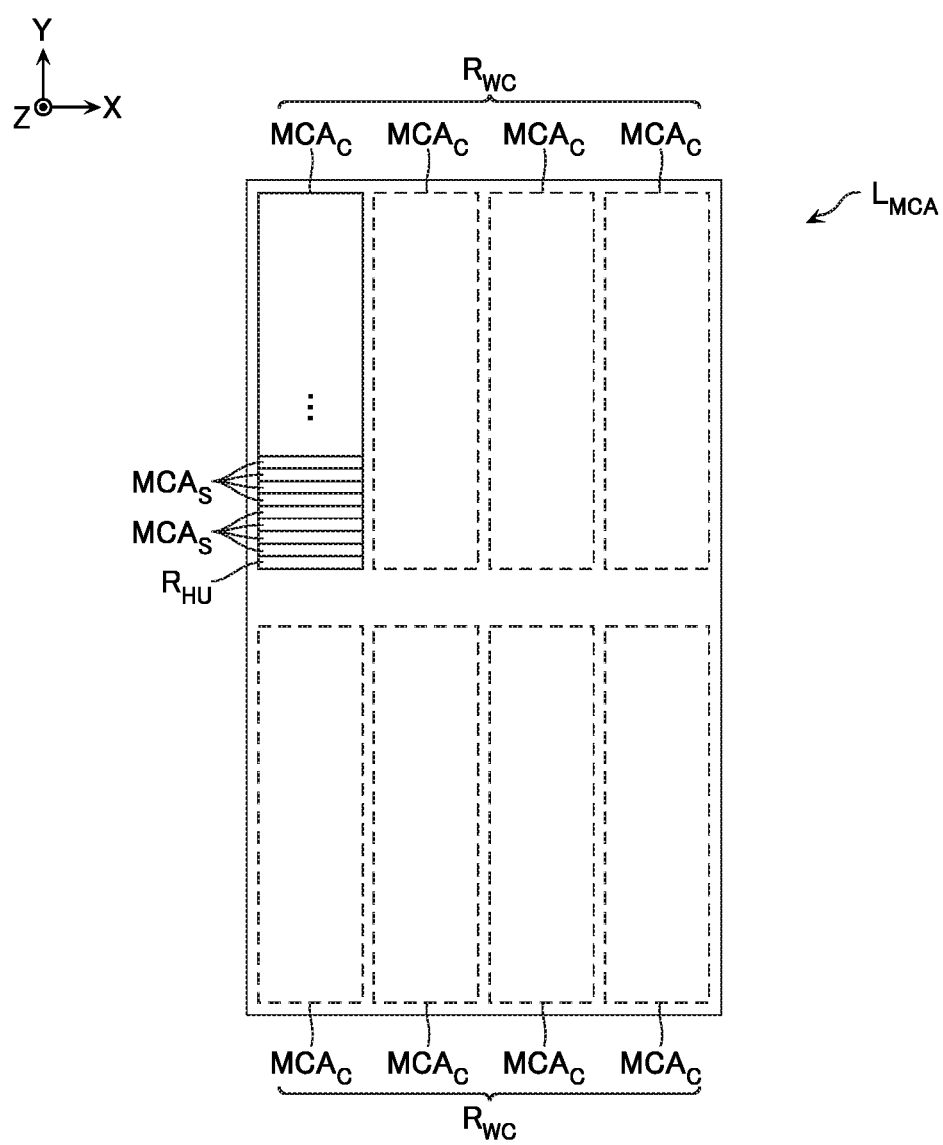
FIG. 2 is a schematic plan view showing configurations of a memory cell array layer $L_{MCA}$.

FIG. 2 is a schematic plan view showing configurations of the memory cell array layer $L_{MCA}$. The memory cell array layer $L_{MCA}$ comprises two wiring common regions $R_{WC}$ arranged in the Y direction. These two wiring common regions $R_{WC}$ each comprise a plurality of sub array columns $MCA_C$ arranged in the X direction. These plurality of sub array columns $MCA_C$ each comprise a plurality of sub arrays $MCA_S$ arranged in the Y direction. Moreover, an end portion in the Y direction of each sub array column $MCA_C$ is provided with a hookup region $R_{HU}$.

Figure 3:
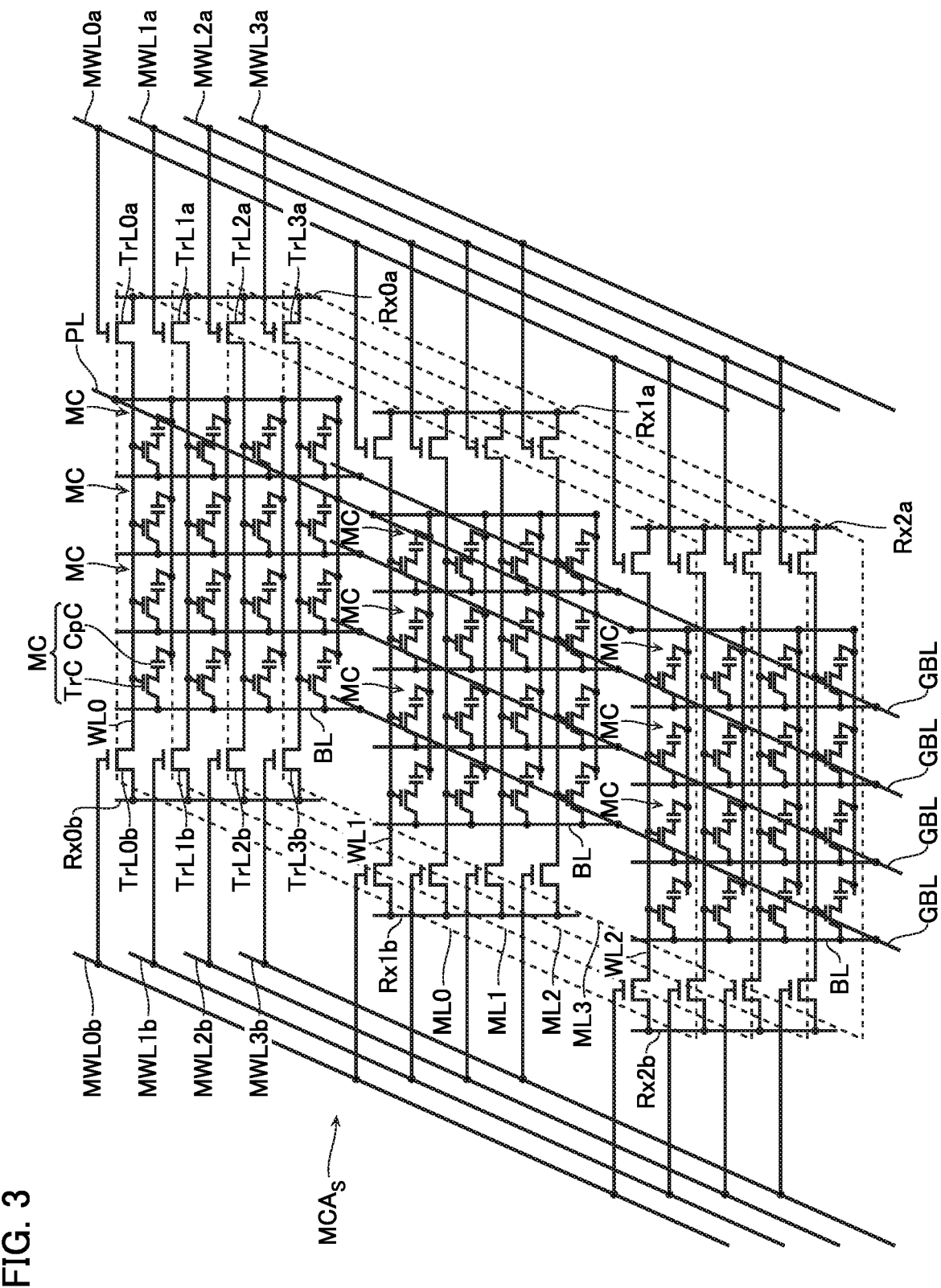
FIG. 3 is a schematic circuit diagram showing some of configurations of a sub array $MCA_S$.

FIG. 3 is a schematic circuit diagram showing some of configurations of the sub array $MCA_S$. The sub array $MCA_S$ comprises: a plurality of memory layers ML0-ML3; a plurality of bit lines BL connected to these plurality of memory layers ML0-ML3; a plurality of global bit lines GBL electrically connected to the plurality of bit lines BL; and a plate line PL connected to the plurality of memory layers ML0-ML3.

The memory layers ML0-ML3 each comprise: a plurality of word lines WL0-WL2; and a plurality of memory cells MC connected to these plurality of word lines WL0-WL2. The memory cells MC each comprise a transistor TrC and a capacitor CpC. A source electrode of the transistor TrC is connected to the bit line BL. A drain electrode of the transistor TrC is connected to the capacitor CpC. A gate electrode of the transistor TrC is connected to any of the word lines WL0-WL2. One electrode of the capacitor CpC is connected to the drain electrode of the transistor TrC. The other electrode of the capacitor CpC is connected to the plate line PL.

Note that each bit line BL is connected to a plurality of the memory cells MC corresponding to the plurality of memory layers ML0-ML3. Moreover, each bit line BL is connected to the global bit line GBL.

Moreover, the memory layers ML0-ML3 each comprise a plurality of transistors TrL0a, TrL0b, TrL1a, TrL1b, TrL2a, TrL2b, TrL3a, TrL3b (hereafter, sometimes called "transistors TrL") provided correspondingly to the plurality of word lines WL0-WL2. Drain electrodes of the transistors TrL are connected to any of the word lines WL0-WL2. Source electrodes of the transistors TrL are respectively connected to row selection lines Rx0a, Rx0b, Rx1a, Rx1b, Rx2a, Rx2b (hereafter, sometimes called "row selection lines Rx"). Gate electrodes of the transistors TrL are respectively connected to main word lines MWL0a, MWL0b, MWL1a, MWL1b, MWL2a, MWL2b, MWL3a, MWL3b (hereafter, sometimes called "main word lines MWL").

Note that the row selection lines Rx are connected to a plurality of the transistors TrL corresponding to the plurality of memory layers ML0-ML3. Moreover, the main word lines MWL0a, MWL1a, MWL2a, MWL3a are respectively commonly connected to all of the transistors TrL0a, TrL1a, TrL2a, TrL3a corresponding to the memory layers ML0-ML3. Similarly, the main word lines MWL0b, MWL1b, MWL2b, MWL3b are respectively commonly connected to all of the transistors TrL0b, TrL1b, TrL2b, TrL3b corresponding to the memory layers ML0-ML3.

Figure 4:
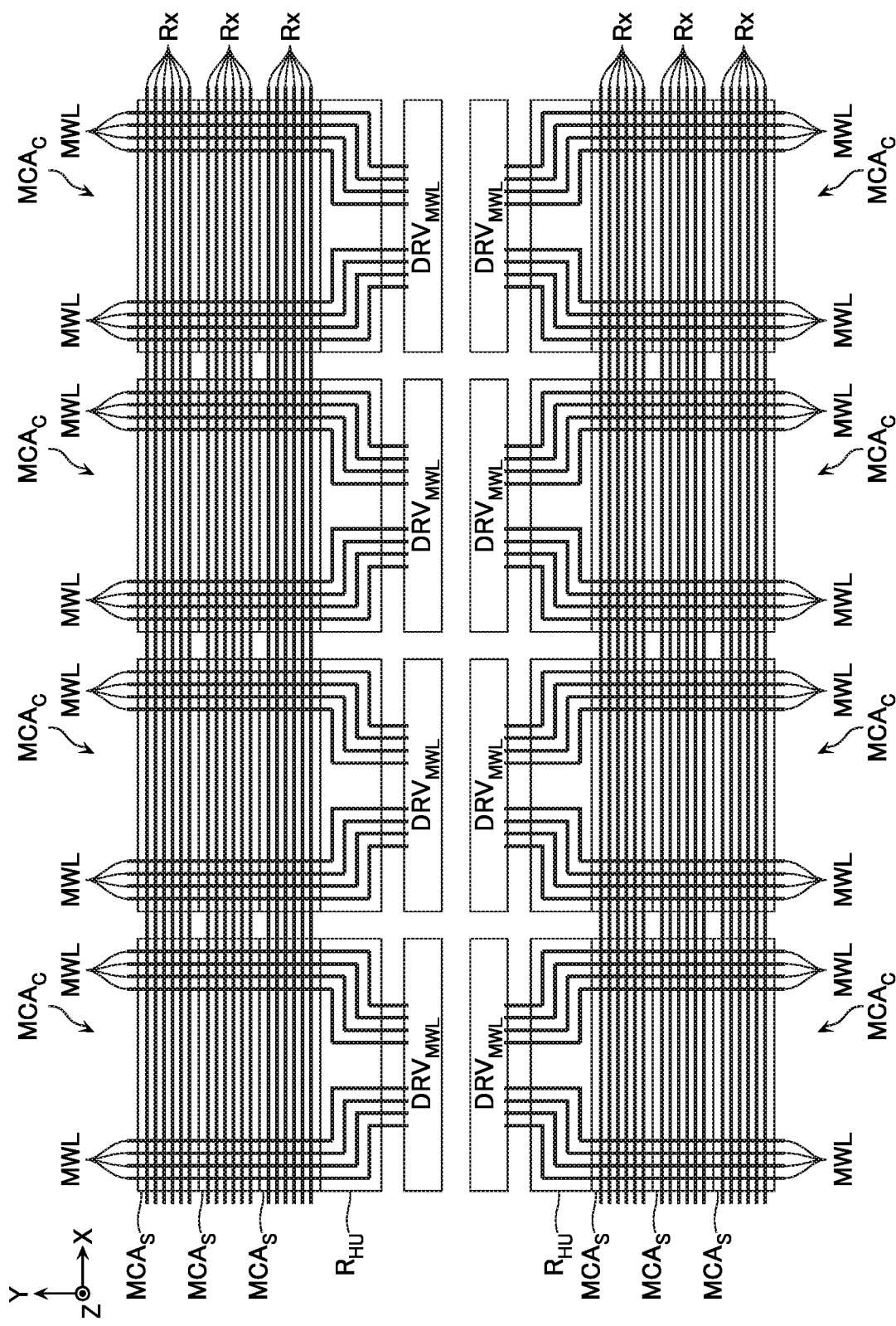
FIG. 4 is a schematic plan view showing some of configurations of the memory cell array layer $L_{MCA}$.

FIG. 4 is a schematic plan view showing some of configurations of the memory cell array layer $L_{MCA}$. Pluralities of the row selection lines Rx are electrically commonly connected among a plurality of the sub arrays $MCA_S$ arranged in the X direction, in the wiring common region $R_{WC}$. These pluralities of row selection lines Rx are respectively connected to unillustrated driver circuits. Moreover, pluralities of the main word lines MWL are electrically commonly connected among a plurality of the sub arrays $MCA_S$ arranged in the Y direction, in the wiring common region $R_{WC}$. These pluralities of main word lines MWL are respectively connected to later-mentioned driver circuits $DRV_{MWL}$ via configurations in the hookup regions $R_{HU}$.

Figure 5:
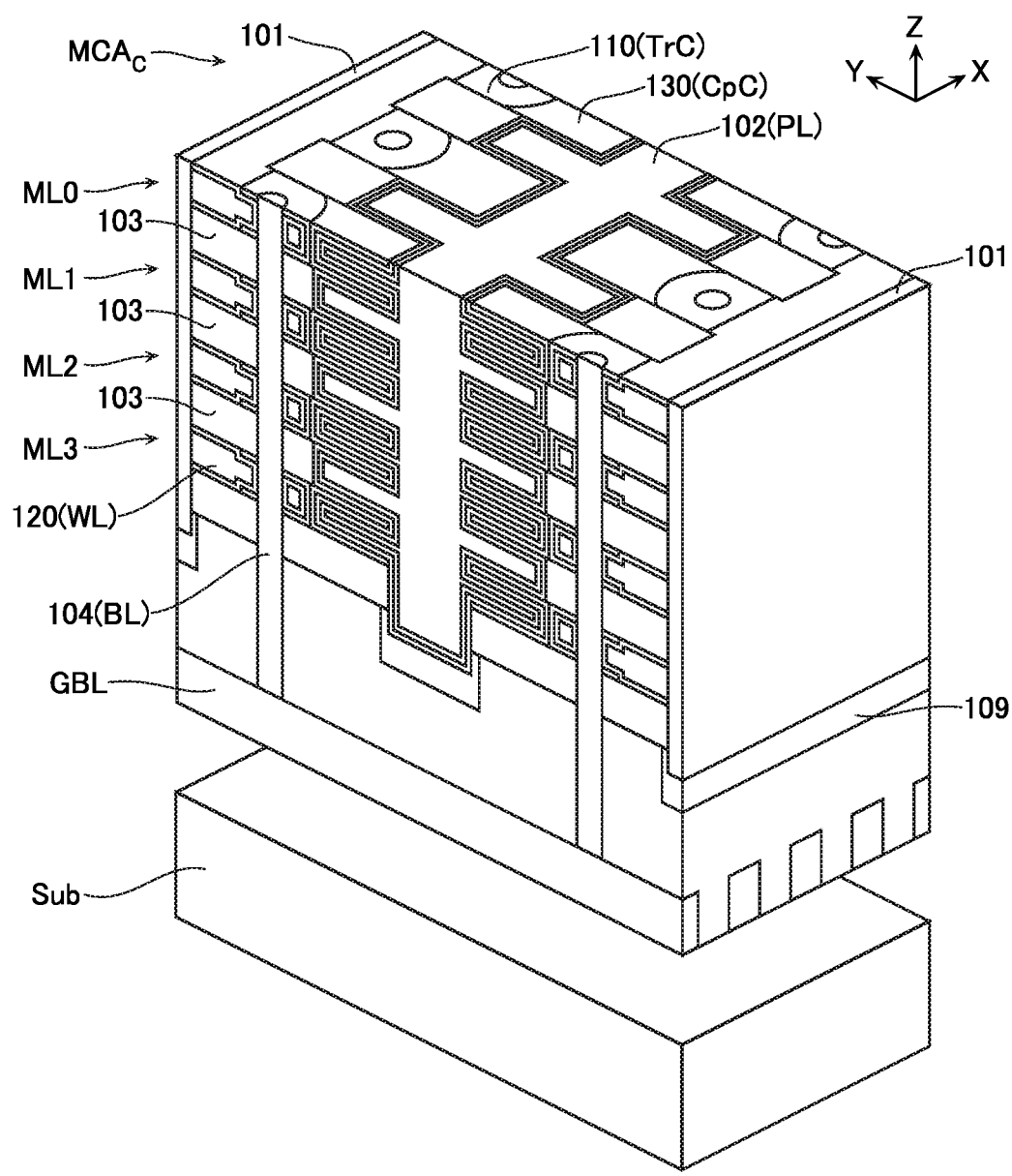
FIG. 5 is a schematic perspective view showing some of configurations of a sub array column $MCA_C$.
Figure 6:
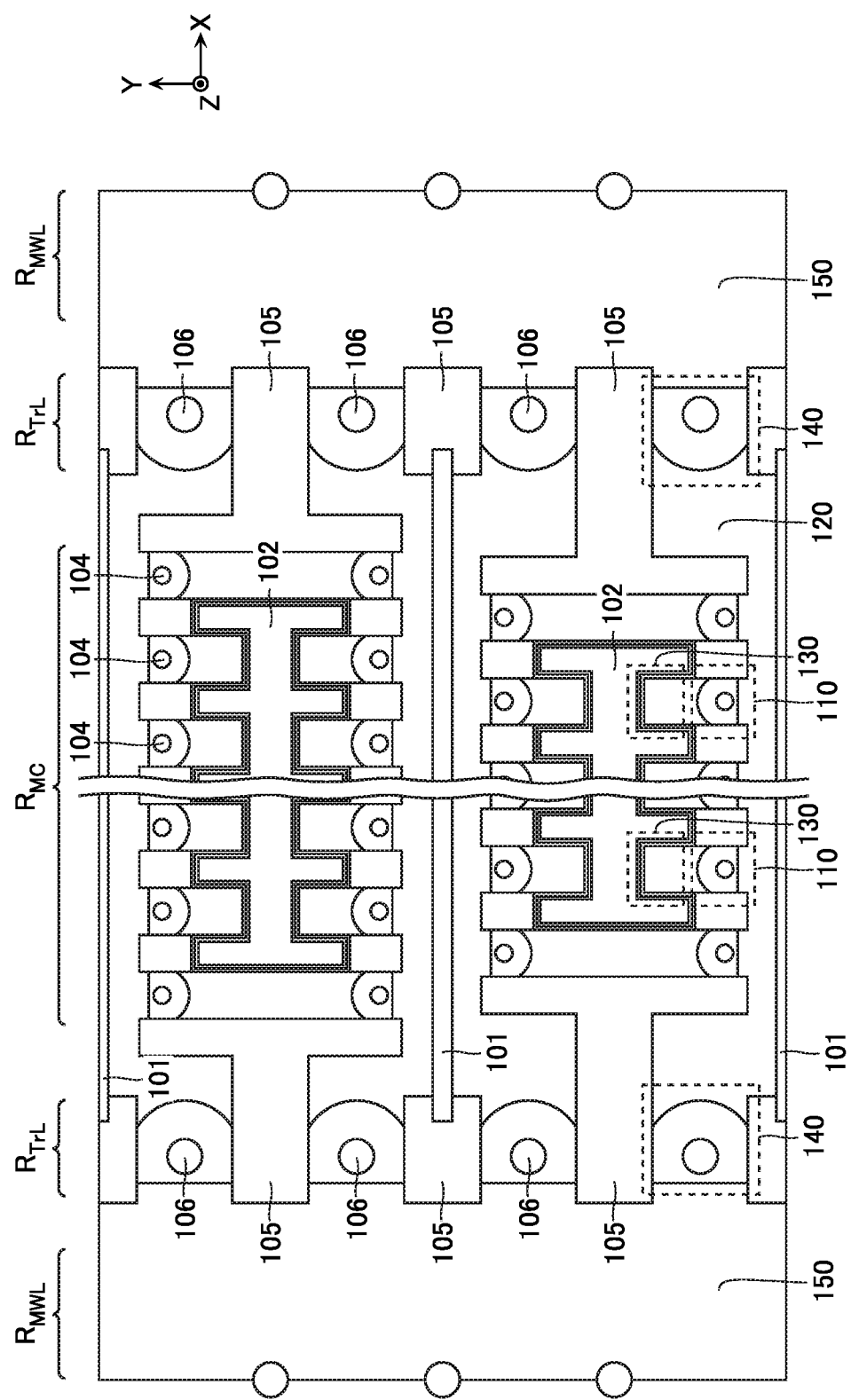
FIG. 6 is a schematic XY cross-sectional view showing some of configurations of the sub array column $MCA_C$.
Figure 7:
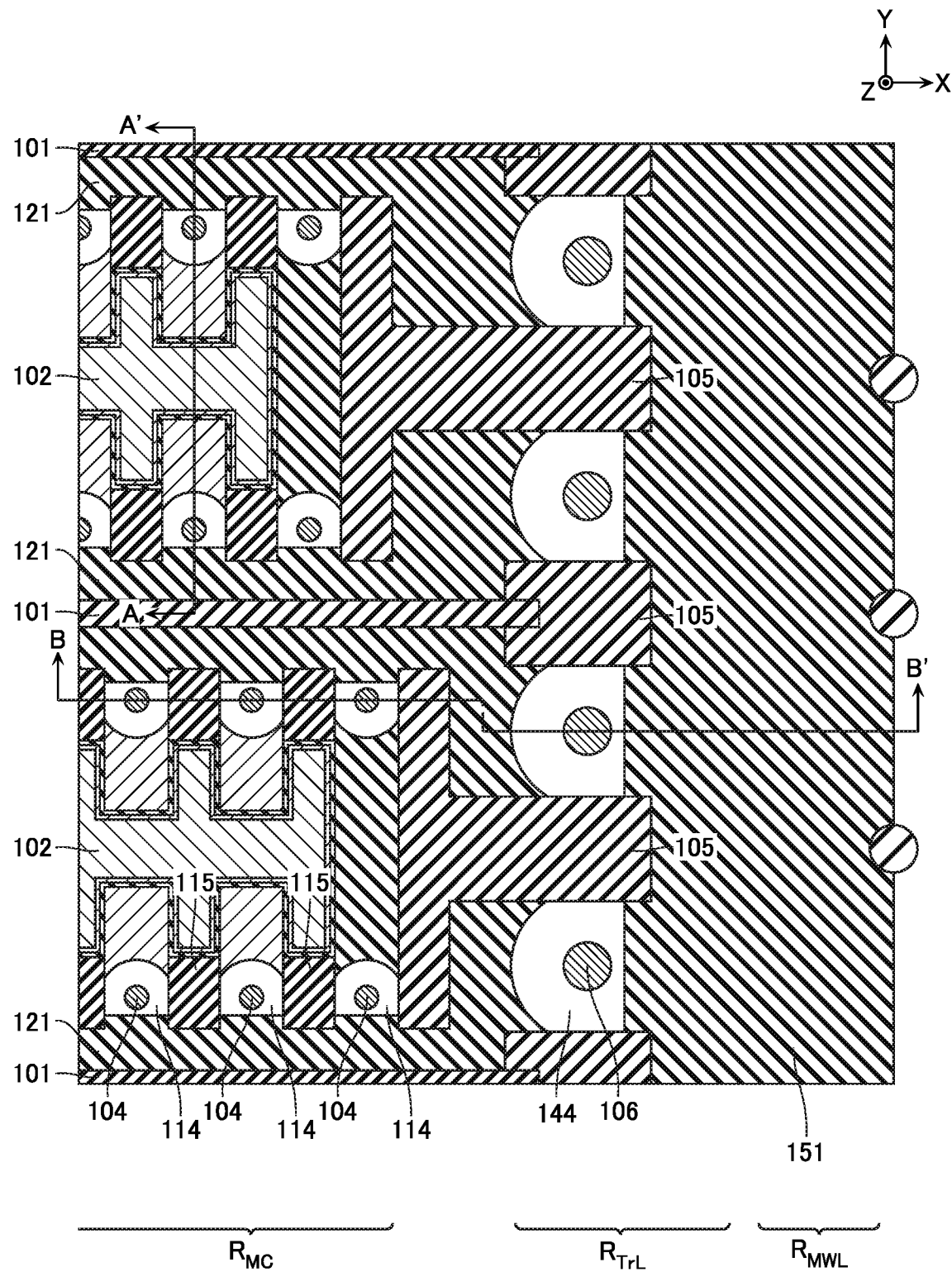
FIG. 7 is a schematic XY cross-sectional view showing some of configurations of the sub array column $MCA_C$.
Figure 8:
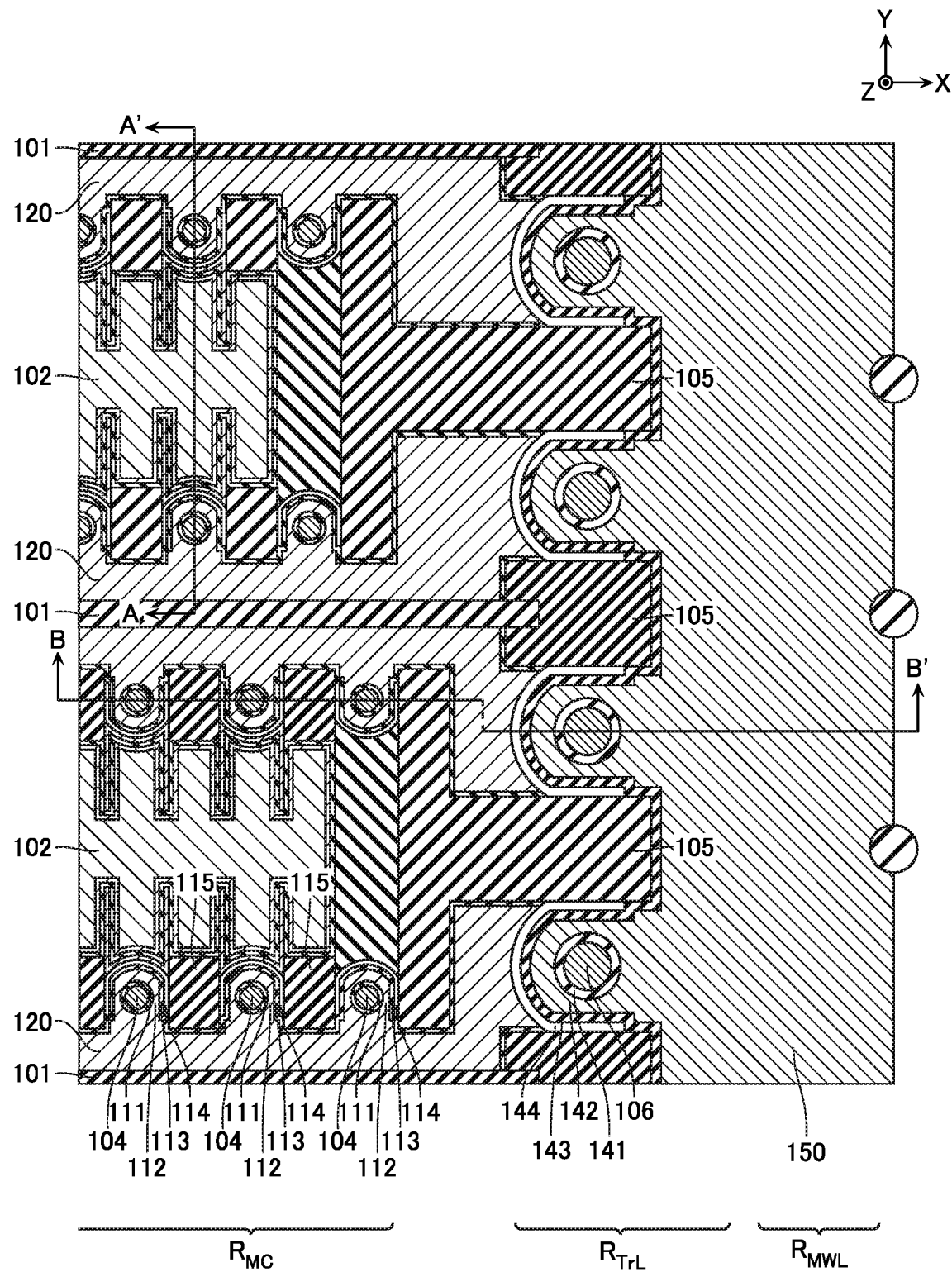
FIG. 8 is a schematic XY cross-sectional view showing some of configurations of the sub array column $MCA_C$.
Figure 9:
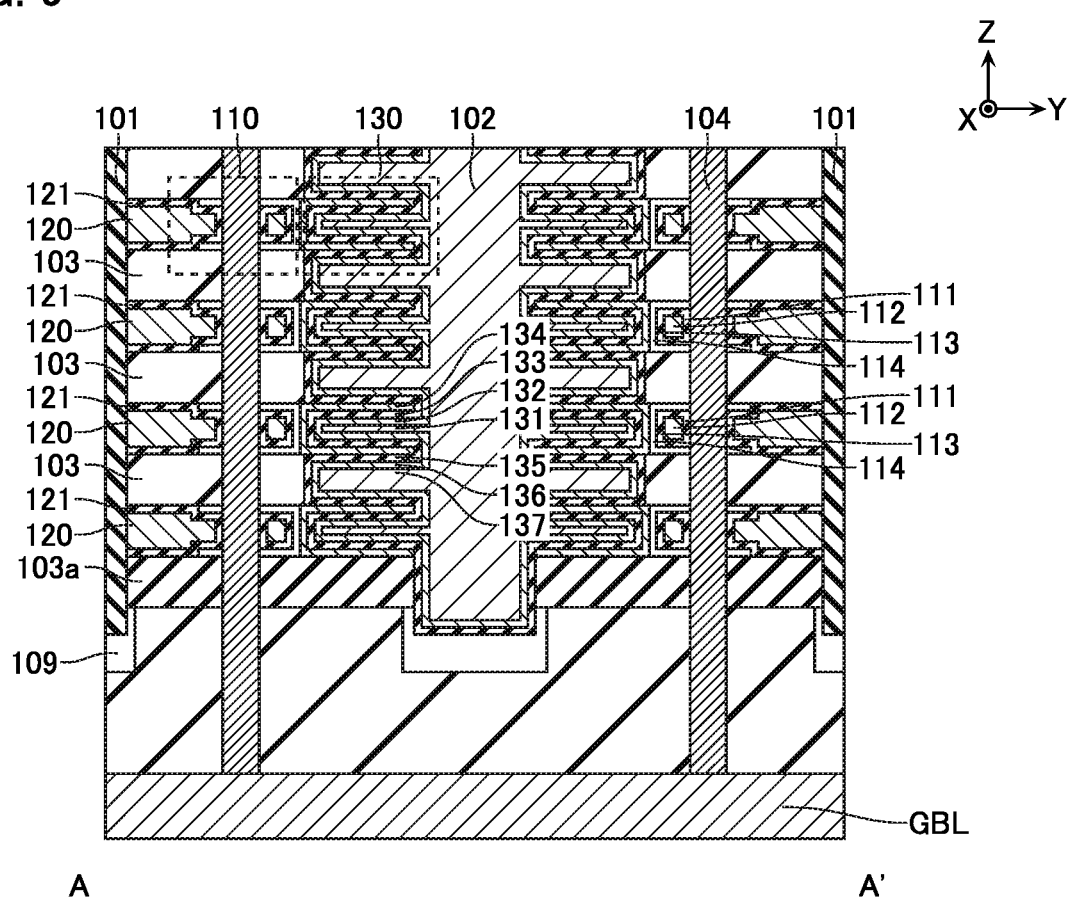
FIG. 9 is a schematic YZ cross-sectional view in which the configurations shown in FIGS. 7 and 8 have been cut along the line A-A' and viewed along a direction of the arrows.
Figure 10:
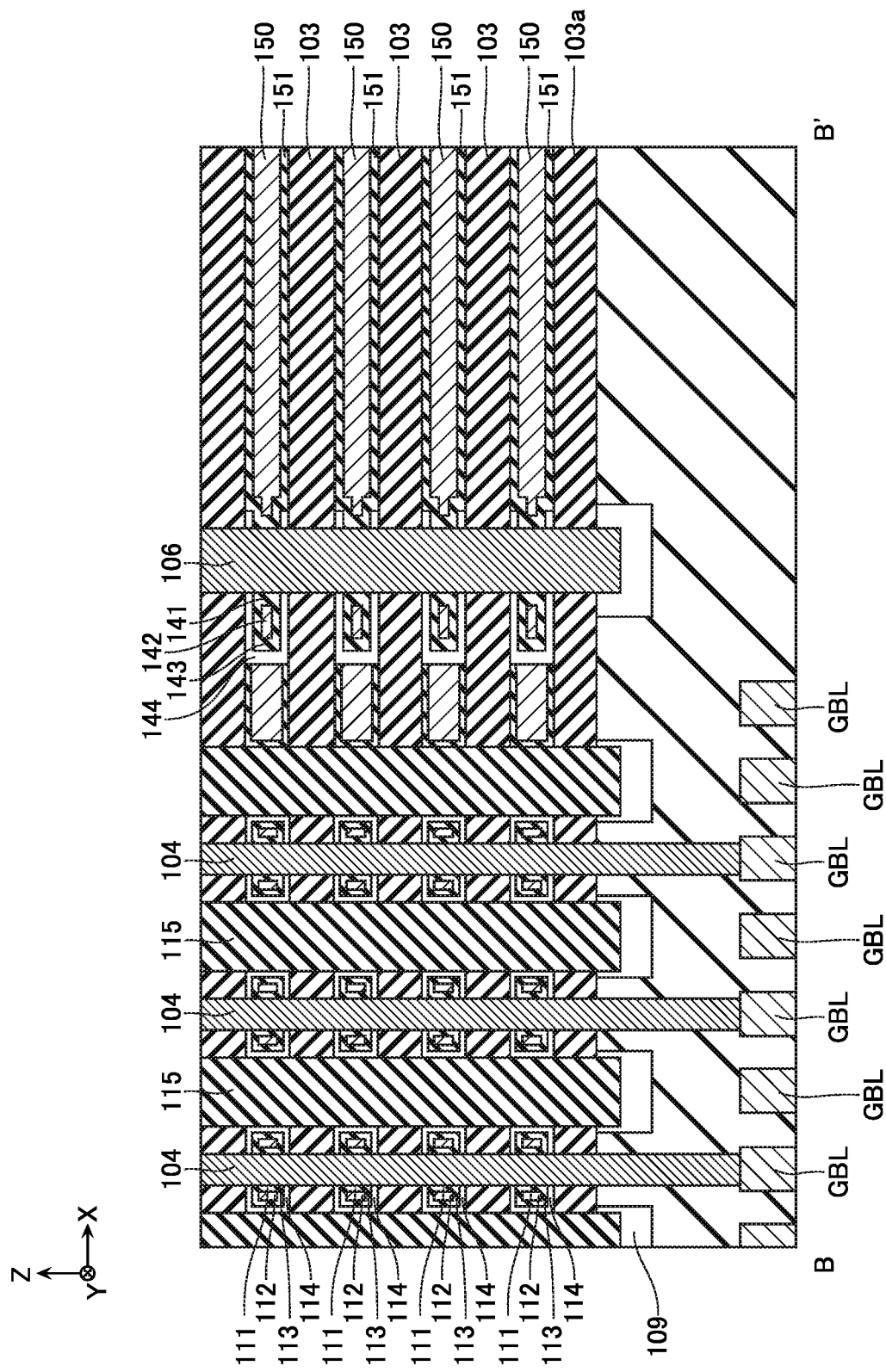
FIG. 10 is a schematic XZ cross-sectional view in which the configurations shown in FIGS. 7 and 8 have been cut along the line B-B' and viewed along a direction of the arrows.

FIG. 5 is a schematic perspective view showing some of configurations of the sub array column $MCA_C$. FIG. 6 is a schematic XY cross-sectional view showing some of configurations of the sub array column $MCA_C$. Note that in FIG. 6, some of configurations (later-mentioned insulating layers 121, 151) are omitted. FIGS. 7 and 8 are schematic XY cross-sectional views showing some of configurations of the sub array column $MCA_C$. Note that FIGS. 7 and 8 show XY cross sections at different height positions. FIG. 9 is a schematic YZ cross-sectional view in which the configurations shown in FIGS. 7 and 8 have been cut along the line A-A' and viewed along a direction of the arrows. FIG. 10 is a schematic XZ cross-sectional view in which the configurations shown in FIGS. 7 and 8 have been cut along the line B-B' and viewed along a direction of the arrows.

As shown in FIG. 5, the sub array column $MCA_C$ comprises: the plurality of memory layers ML0-ML3 arranged in the Z direction; and the plurality of global bit lines GBL provided below these memory layers ML0-ML3. Moreover, insulating layers 103 of the likes of silicon oxide ($SiO_2$) are respectively provided between the plurality of memory layers ML0-ML3.

As shown in FIG. 6, the memory layers ML0-ML3 comprise: a memory cell region $R_{MC}$; and transistor regions $R_{TrL}$ and main word line regions $R_{MWL}$ respectively provided on one side and the other side of the memory cell region $R_{MC}$ in the X direction. The transistor regions $R_{TrL}$ are respectively provided between the memory cell region $R_{MC}$ and the main word line regions $R_{MWL}$.

The memory cell region $R_{MC}$ is provided with a plurality of insulating layers 101 and plurality of conductive layers 102 arranged alternately in the Y direction. As shown in FIG. 5, these plurality of insulating layers 101 and plurality of conductive layers 102 extend in the X direction and the Z direction, and divide the memory layers ML0-ML3 in the Y direction.

The insulating layer 101 includes the likes of silicon oxide ($SiO_2$), for example.

The conductive layer 102 includes the likes of a stacked structure of titanium nitride (TiN) and tungsten (W), for example. The conductive layer 102 functions as the plate line PL (FIG. 3), for example.

Moreover, as shown in FIG. 6, for example, the memory cell region $R_{MC}$ is provided with a plurality of conductive layers 104 that are provided between the insulating layer 101 and the conductive layer 102. The plurality of conductive layers 104 are arranged in the X direction and extend in the Z direction penetrating the plurality of memory layers ML0-ML3.

The conductive layer 104 includes the likes of a stacked structure of indium tin oxide (ITO), titanium nitride (TiN), and tungsten (W), for example. The conductive layer 104 functions as the bit line BL (FIG. 3), for example. A plurality of the bit lines BL are provided correspondingly to the plurality of transistors TrC included in the memory layers ML0-ML3.

In the memory cell region $R_{MC}$, as shown in FIG. 6, for example, the memory layers ML0-ML3 comprise: a plurality of transistor structures 110 provided correspondingly to the plurality of conductive layers 104; a conductive layer 120 provided between the plurality of transistor structures 110 and the insulating layer 101; and a plurality of capacitor structures 130 provided between the plurality of transistor structures 110 and the conductive layer 102.

As shown in FIGS. 8 and 9, for example, the transistor structure 110 comprises: an insulating layer 111 provided on an outer peripheral surface of the conductive layer 104; a conductive layer 112 provided on an outer peripheral surface of the insulating layer 111; an insulating layer 113 provided on an upper surface, lower surface, and outer peripheral surface of the conductive layer 112; and a semiconductor layer 114 provided on an upper surface, lower surface, and outer peripheral surface of the insulating layer 113.

Note that in the XY cross section of the kind exemplified in FIG. 8, the outer peripheral surface of the insulating layer 111 may be formed along a circle centering on a center position of the conductive layer 104, for example. Moreover, side surfaces on one side in the Y direction (a conductive layer 102 side) of the conductive layer 112, insulating layer 113, and semiconductor layer 114 may be formed along a circle centering on a center position of the conductive layer 104. Moreover, both side surfaces in the X direction of the conductive layer 112, insulating layer 113, and semiconductor layer 114 may be formed linearly along a side surface of an insulating layer 115.

The insulating layer 111 includes the likes of silicon oxide ($SiO_2$), for example. The insulating layer 111 surrounds the outer peripheral surface of the conductive layer 104 over its entire periphery.

The conductive layer 112 functions as the gate electrode of the transistor TrC (FIG. 3), for example. The conductive layer 112 includes the likes of a stacked structure of titanium nitride (TiN) and tungsten (W), for example. The conductive layer 112 surrounds the outer peripheral surface of the insulating layer 111 over its entire periphery. As shown in FIG. 8, a plurality of the conductive layers 112 arranged in the X direction are commonly connected to the conductive layer 120 extending in the X direction.

The insulating layer 113 functions as a gate insulating film of the transistor TrC (FIG. 3), for example. The insulating layer 113 includes the likes of silicon oxide ($SiO_2$), for example. The insulating layer 113 covers both of the side surfaces in the X direction and the side surface on one side in the Y direction (the conductive layer 102 side), of the conductive layer 112.

The semiconductor layer 114 functions as a channel region of the transistor TrC (FIG. 3), for example. The semiconductor layer 114 may be, for example, a semiconductor including: oxygen (O); indium (In); zinc (Zn); and at least one element selected from the group consisting of gallium (Ga) and aluminum (Al), or may be, for example, another oxide semiconductor. The semiconductor layer 114 covers both of the side surfaces in the X direction and the side surface on one side in the Y direction (the conductive layer 102 side), of the conductive layer 112, via the insulating layer 113. As shown in FIG. 9, a plurality of the semiconductor layers 114 arranged in the Z direction are commonly connected to the conductive layer 104 extending in the Z direction. As shown in FIG. 7, the insulating layer 115 of the likes of silicon oxide ($SiO_2$) is provided between two of the semiconductor layers 114 adjacent in the X direction.

The conductive layer 120 functions as the word line WL (FIG. 3), for example. As shown in FIG. 8, for example, the conductive layer 120 extends in the X direction and is connected to a plurality of the conductive layers 112 arranged in the X direction. The conductive layer 120 comprises the likes of a stacked structure of titanium nitride (TiN) and tungsten (W), for example. Note that as shown in FIG. 9, for example, an upper surface and lower surface of the conductive layer 120 are covered by the insulating layer 121 of the likes of silicon oxide ($SiO_2$). The insulating layer 121 is connected to the insulating layer 111 and the insulating layer 113.

As shown in FIG. 9, for example, the capacitor structure 130 comprises: a conductive layer 131; a conductive layer 132 provided on an upper surface, lower surface, and side surface in the Y direction of the conductive layer 131; an insulating layer 133 provided on an upper surface, lower surface, and side surface in the Y direction of the conductive layer 132; a conductive layer 134 provided on an upper surface, lower surface, and side surface in the Y direction of the insulating layer 133; an insulating layer 135 provided on an upper surface, lower surface, and side surface in the Y direction of the conductive layer 134; a conductive layer 136 provided on an upper surface, lower surface, and side surface in the Y direction of the insulating layer 135; and a conductive layer 137 provided on an upper surface, lower surface, and side surface in the Y direction of the conductive layer 136.

The conductive layers 131, 132, 136, 137 function as one electrode of the capacitor CpC (FIG. 3). The conductive layers 131, 137 include the likes of tungsten (W), for example. The conductive layers 132, 136 include the likes of titanium nitride (TiN), for example. The conductive layers 131, 132, 136, 137 are connected to the conductive layer 102.

The insulating layers 133, 135 function as an insulating layer of the capacitor CpC (FIG. 3). The insulating layers 133, 135 may be alumina ($Al_2O_3$) or another insulative metal oxide, for example.

The conductive layer 134 functions as the other electrode of the capacitor CpC (FIG. 3), for example. The conductive layer 134 includes the likes of indium tin oxide (ITO), for example. The conductive layer 134 is insulated from the conductive layers 131, 132, 136, 137 via the insulating layers 133, 135. The conductive layer 134 is connected to a side surface in the Y direction of the semiconductor layer 114.

As shown in FIG. 6, for example, the transistor region $R_{TrL}$ is provided with a plurality of insulating layers 105 arranged in the Y direction. These plurality of insulating layers 105 extend in the Z direction penetrating the plurality of memory layers ML0-ML3.

The insulating layer 105 includes the likes of silicon oxide ($SiO_2$), for example.

Moreover, the transistor region $R_{TrL}$ is provided with a plurality of conductive layers 106 that are provided between the insulating layers 105. The plurality of conductive layers 106 are arranged in the Y direction and extend in the Z direction penetrating the plurality of memory layers ML0-ML3 (refer to FIG. 10).

The conductive layer 106 includes the likes of a stacked structure of indium tin oxide (ITO), titanium nitride (TiN), and tungsten (W), for example. The conductive layer 106 functions as the row selection line Rx (FIG. 3), for example. A plurality of the row selection lines Rx are provided correspondingly to the plurality of transistors TrL included in the memory layers ML0-ML3.

In the transistor region $R_{TrL}$, as shown in FIG. 6, for example, the memory layers ML0-ML3 comprise a plurality of transistor structures 140 provided correspondingly to the plurality of conductive layers 106.

As shown in FIGS. 8 and 10, for example, the transistor structure 140 comprises: an insulating layer 141 provided on an outer peripheral surface of the conductive layer 106; a conductive layer 142 provided on an outer peripheral surface of the insulating layer 141; an insulating layer 143 provided on an upper surface, lower surface, and outer peripheral surface of the conductive layer 142; and a semiconductor layer 144 provided on an upper surface, lower surface, and outer peripheral surface of the insulating layer 143.

Note that in the XY cross section of the kind exemplified in FIG. 8, the outer peripheral surface of the insulating layer 141 may be formed along a circle centering on a center position of the conductive layer 106, for example. Moreover, side surfaces on one side in the X direction (a conductive layer 120 side) of the conductive layer 142, insulating layer 143, and semiconductor layer 144 may be formed along a circle centering on a center position of the conductive layer 106. Moreover, both side surfaces in the Y direction of the conductive layer 142, insulating layer 143, and semiconductor layer 144 may be formed linearly along a side surface of the insulating layer 105.

The insulating layer 141 includes the likes of silicon oxide ($SiO_2$), for example. The insulating layer 141 surrounds the outer peripheral surface of the conductive layer 106 over its entire periphery.

The conductive layer 142 functions as the gate electrode of the transistor TrL (FIG. 3), for example. The conductive layer 142 includes the likes of a stacked structure of titanium nitride (TiN) and tungsten (W), for example. The conductive layer 142 surrounds the outer peripheral surface of the insulating layer 141 over its entire periphery. As shown in FIG. 8, a plurality of the conductive layers 142 arranged in the Y direction are commonly connected to a conductive layer 150 extending in the Y direction.

The insulating layer 143 functions as a gate insulating film of the transistor TrL (FIG. 3), for example. The insulating layer 143 includes the likes of silicon oxide ($SiO_2$), for example. The insulating layer 143 covers both of the side surfaces in the Y direction and the side surface on one side in the X direction (the conductive layer 120 side), of the conductive layer 142.

The semiconductor layer 144 functions as a channel region of the transistor TrL (FIG. 3), for example. The semiconductor layer 144 may be, for example, a semiconductor including: oxygen (O); indium (In); zinc (Zn); and at least one element selected from the group consisting of gallium (Ga) and aluminum (Al), or may be, for example, another oxide semiconductor. The semiconductor layer 144 covers both of the side surfaces in the Y direction and the side surface on one side in the X direction (the conductive layer 120 side), of the conductive layer 142, via the insulating layer 143. As shown in FIG. 10, a plurality of the semiconductor layers 144 arranged in the Z direction are commonly connected to the conductive layer 106 extending in the Z direction. As shown in FIG. 8, the insulating layer 105 is provided between two of the semiconductor layers 144 adjacent in the Y direction. Note that the semiconductor layer 144 is connected to an end portion in the X direction of the conductive layer 120.

In the main word line region $R_{MWL}$, as shown in FIG. 6, for example, the memory layers ML0-ML3 comprise the conductive layer 150 extending in the Y direction along a plurality of the transistor structures 140.

The conductive layer 150 (FIG. 8) functions as the main word line MWL (FIG. 3), for example. The conductive layer 150 extends in the Y direction across a plurality of the sub arrays $MCA_S$ arranged in the Y direction in the wiring common region $R_{WC}$ (FIGS. 2 and 4). Moreover, the conductive layer 150 is connected to the plurality of conductive layers 142 included in these plurality of sub arrays $MCA_S$. For example, in the case of 128 sub arrays $MCA_S$ being included in the sub array column $MCA_C$ and the number of word lines WL (conductive layers 120) arranged in the Y direction in the sub array $MCA_S$ being 64, the conductive layer 150 is connected to 8192 (=128×64) conductive layers 142. The conductive layer 150 comprises the likes of a stacked structure of titanium nitride (TiN) and tungsten (W), for example. Note that as shown in FIG. 10, for example, an upper surface and lower surface of the conductive layer 150 are covered by the insulating layer 151 of the likes of silicon oxide ($SiO_2$). The insulating layer 151 is connected to the insulating layer 141 and the insulating layer 143.

Moreover, a plurality of the global bit lines GBL are provided below the memory layers ML0-ML3, as shown in FIG. 5. The global bit lines GBL extend in the Y direction and are arranged in the X direction. The global bit line GBL includes the likes of a stacked structure of titanium nitride (TiN) and tungsten (W), for example. The global bit lines GBL are respectively connected to lower ends of a plurality of the conductive layers 104 arranged in the Y direction.

Moreover, as shown in FIG. 5, an etching stopper 109 is provided between the memory layers ML0-ML3 and the plurality of global bit lines GBL. The etching stoppers 109 are provided correspondingly to the insulating layer 101, conductive layer 102, insulating layer 105, and conductive layer 106, and are connected to lower ends thereof. The etching stopper 109 comprises a shape that follows a shape of the lower end of the configuration to which it corresponds. For example, the etching stopper 109 corresponding to the insulating layer 101 extends in the X direction correspondingly to the insulating layer 101. Similarly, the etching stopper 109 corresponding to the conductive layer 102 extends in the X direction correspondingly to the conductive layer 102.

Moreover, an insulating layer 103a is provided between the memory layers ML0-ML3 and the etching stopper 109 (refer to FIG. 9). The insulating layer 103a may include, for example, a material differing from that of another insulating layer 103. For example, the insulating layer 103a may include the likes of silicon oxycarbide (SiOC).

Figure 11:
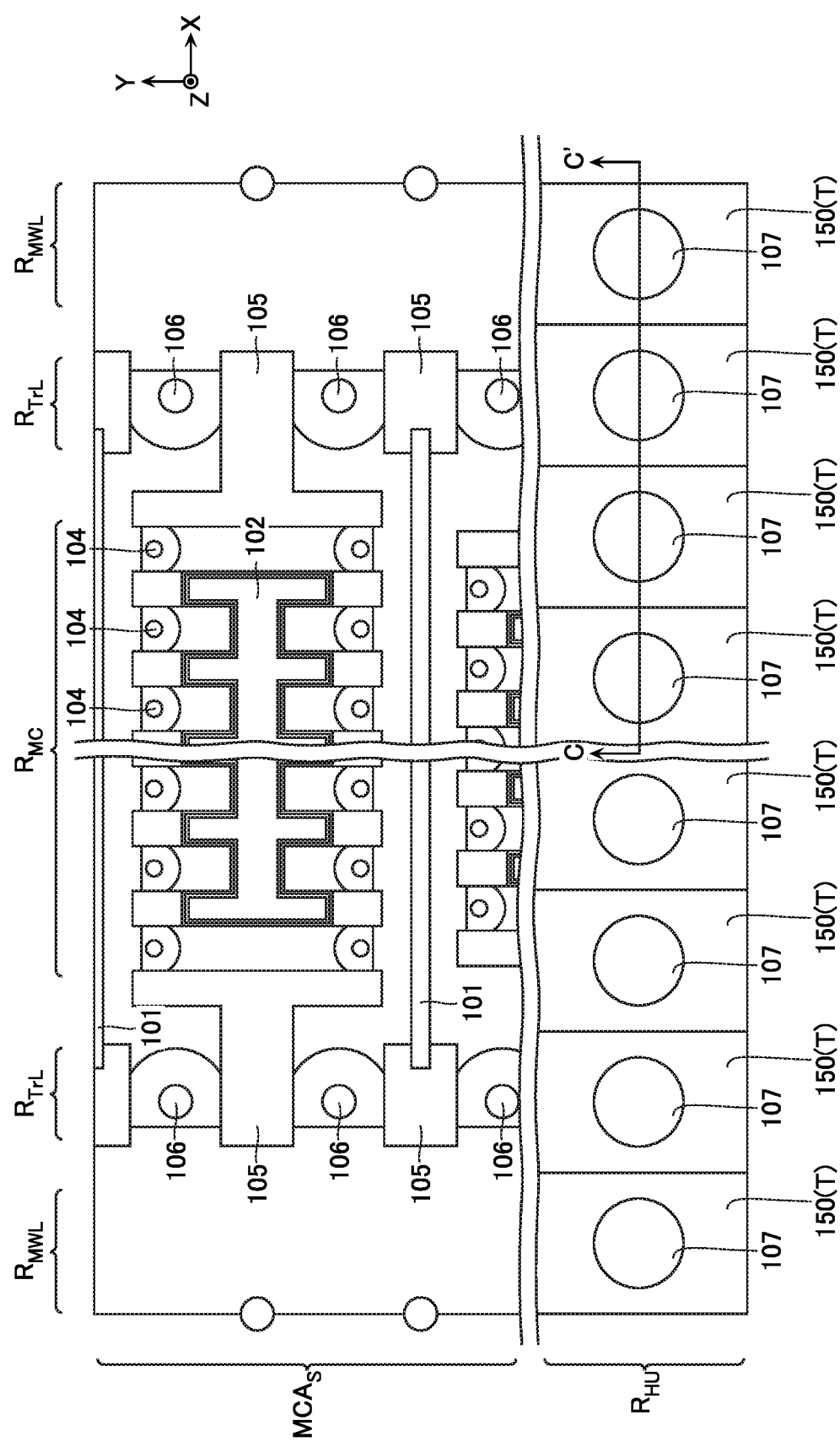
FIG. 11 is a schematic XY cross-sectional view showing some of configurations of a hookup region $R_{HU}$.
Figure 12:
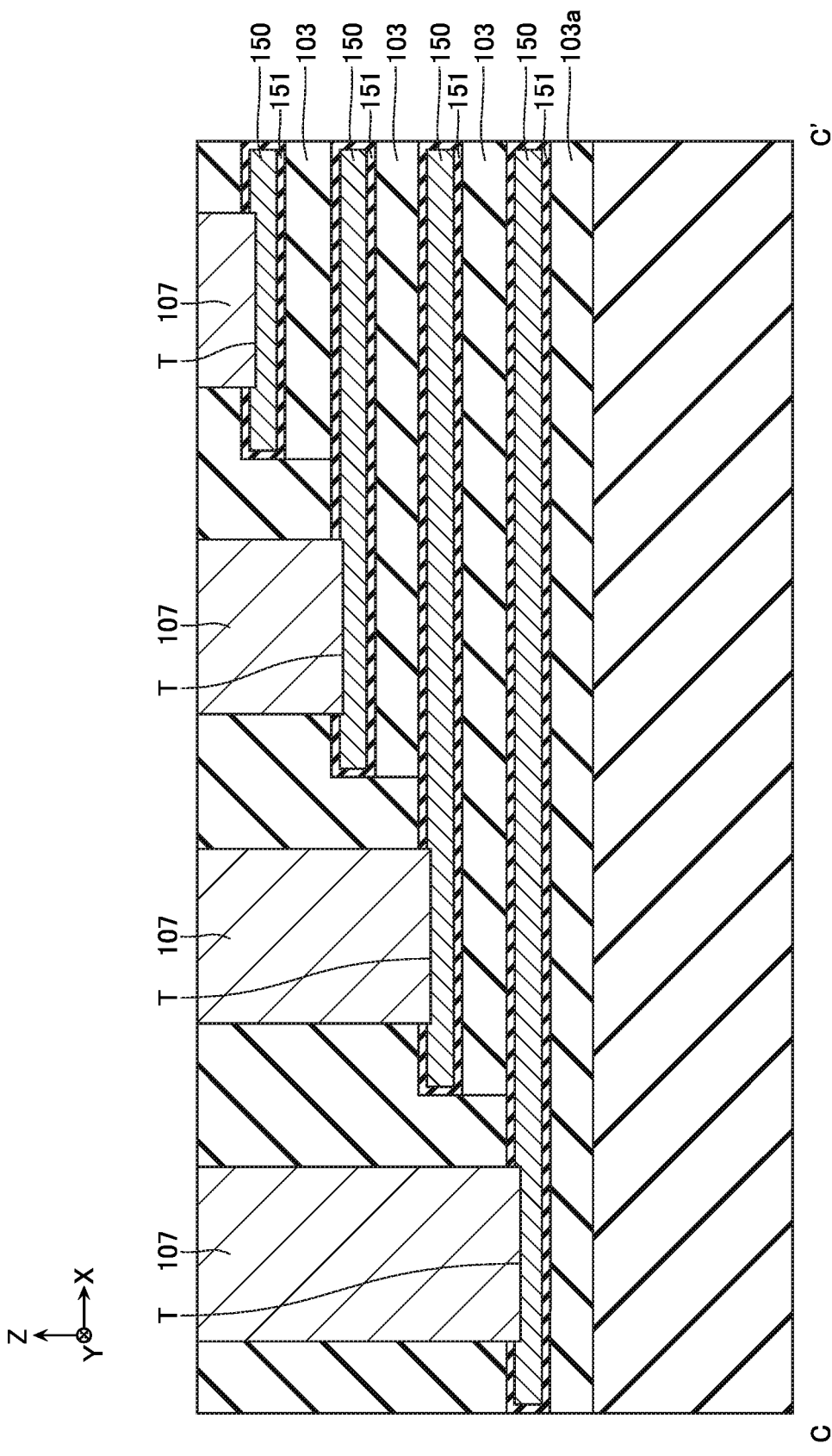
FIG. 12 is a schematic XZ cross-sectional view in which the configurations shown in FIG. 11 have been cut along the line C-C' and viewed along a direction of the arrows.

FIG. 11 is a schematic XY cross-sectional view showing some of configurations of the hookup region $R_{HU}$. Note that in FIG. 11, some of the configurations (the insulating layers 121, 151) are omitted. FIG. 12 is a schematic XZ cross-sectional view in which the configurations shown in FIG. 11 have been cut along the line C-C' and viewed along a direction of the arrows.

In the hookup region $R_{HU}$, as shown in FIG. 11, for example, the memory layers ML0-ML3 comprise a terrace portion T of the conductive layer 150. The terrace portion T is, for example, a portion that, looking from above, does not overlap another of the conductive layers 150, of the upper surface of the conductive layer 150. In the example of FIG. 11, the terrace portion T is provided in an end portion in the Y direction of the conductive layer 150.

Moreover, as shown in FIG. 11, for example, the hookup region $R_{HU}$ is provided with a plurality of contact electrodes 107 arranged in the X direction. As shown in FIG. 12, the contact electrode 107 extends in the Z direction and has its lower end connected to the terrace portion T of the conductive layer 150. Moreover, the plurality of contact electrodes 107 arranged in the X direction are respectively connected to conductive layers 150 provided at different height positions. The contact electrode 107 includes the likes of a stacked structure of titanium nitride (TiN) and tungsten (W), for example.

Note that the contact electrodes 107 are connected to all of the memory layers ML0-ML3. Hence, the number of contact electrodes 107 included in one main word line region $R_{MWL}$ must be as many as the number of memory layers ML0-ML3 arranged in the Z direction.

[Transistor Layer $L_T$]

A part of the peripheral circuit controlling configurations in the memory cell array layer $L_{MCA}$ is provided in the transistor layer $L_T$ (FIG. 1). In order to realize such a part of the peripheral circuit, the transistor layer $L_T$ is provided with a plurality of transistors, wirings, and so on. A surface of the semiconductor substrate Sub (FIG. 1), for example, is adopted as channel regions of these plurality of transistors.

Figure 13:
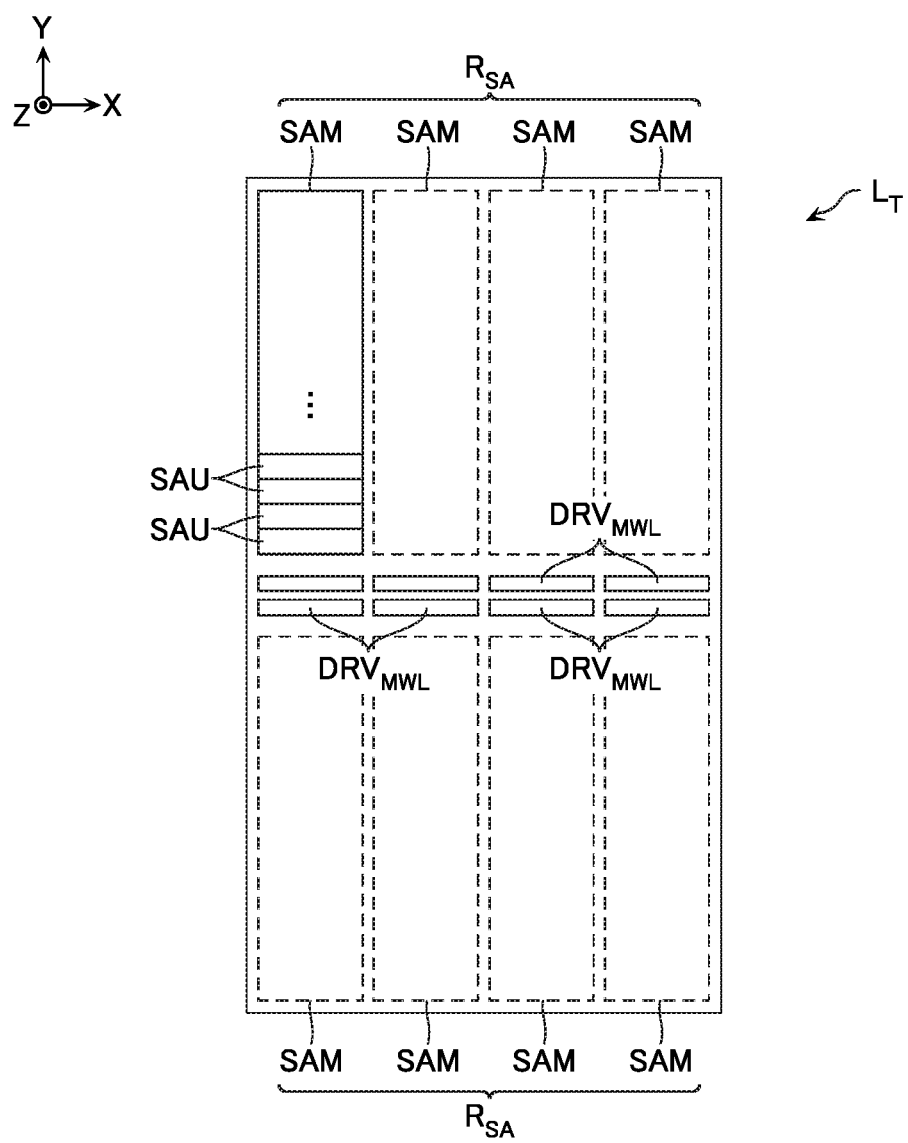
FIG. 13 is a schematic plan view showing configurations of a transistor layer $L_T$.

FIG. 13 is a schematic plan view showing configurations of the transistor layer $L_T$. The transistor layer $L_T$ comprises two sense amplifier regions $R_{SA}$ provided correspondingly to the two wiring common regions $R_{WC}$ (FIG. 2). These two sense amplifier regions $R_{SA}$ each comprise a plurality of sense amplifier modules SAM provided correspondingly to the plurality of sub array columns $MCA_C$. These plurality of sense amplifier modules SAM each comprise a plurality of sense amplifier units SAU arranged in the Y direction. These plurality of sense amplifier units SAU are each provided in a region overlapping two of the sub arrays $MCA_S$ (FIG. 2) adjacent in the Y direction looking from above.

Moreover, a plurality of the driver circuits $DRV_{MWL}$ are provided between the two sense amplifier regions $R_{SA}$ arranged in the Y direction. These plurality of driver circuits $DRV_{MWL}$ are respectively provided correspondingly to the plurality of sub arrays $MCA_S$ (FIG. 2).

Figure 14:
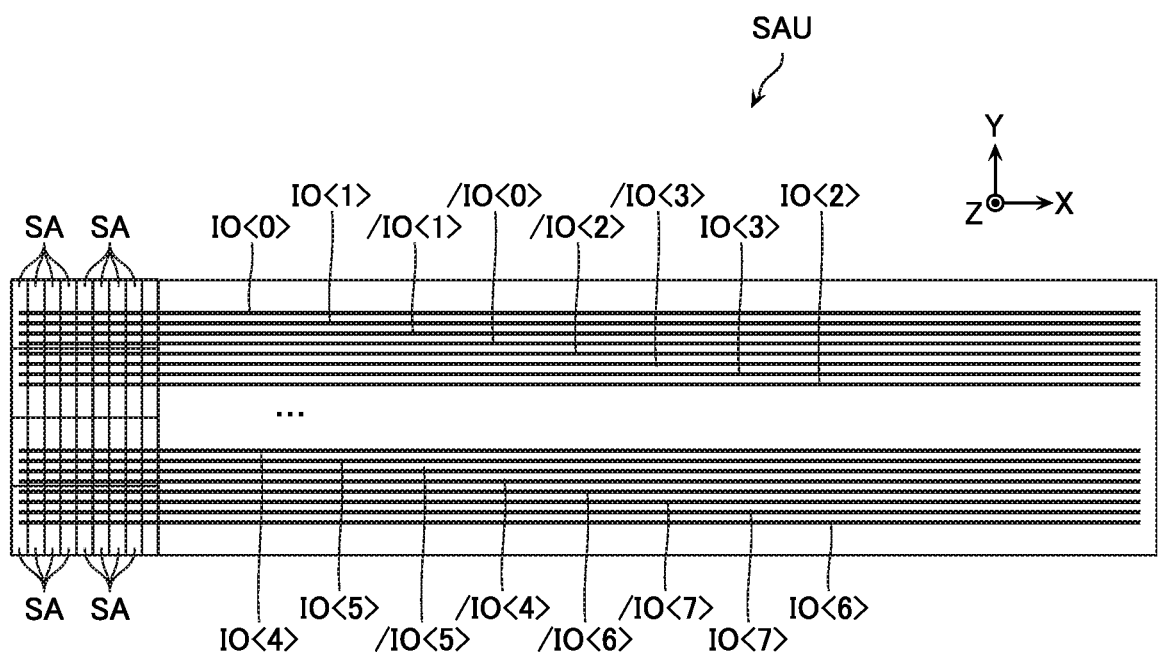
FIG. 14 is a schematic plan view showing configurations of a sense amplifier unit SAU.

FIG. 14 is a schematic plan view showing configurations of the sense amplifier unit SAU. The sense amplifier unit SAU comprises a plurality of sense amplifiers SA arranged in the X direction and the Y direction. In the example illustrated, four sense amplifiers SA are arranged in the Y direction.

FIG. 14 illustrates a plurality of data input/output signal lines IO, /IO (in the example of FIG. 14, data input/output signal lines IO<0>-IO<7>, /IO<0>-/IO<7>). The sense amplifiers SA are each connected to one of the plurality of data input/output signal lines IO and one of the plurality of data input/output signal lines /IO.

Figure 15:
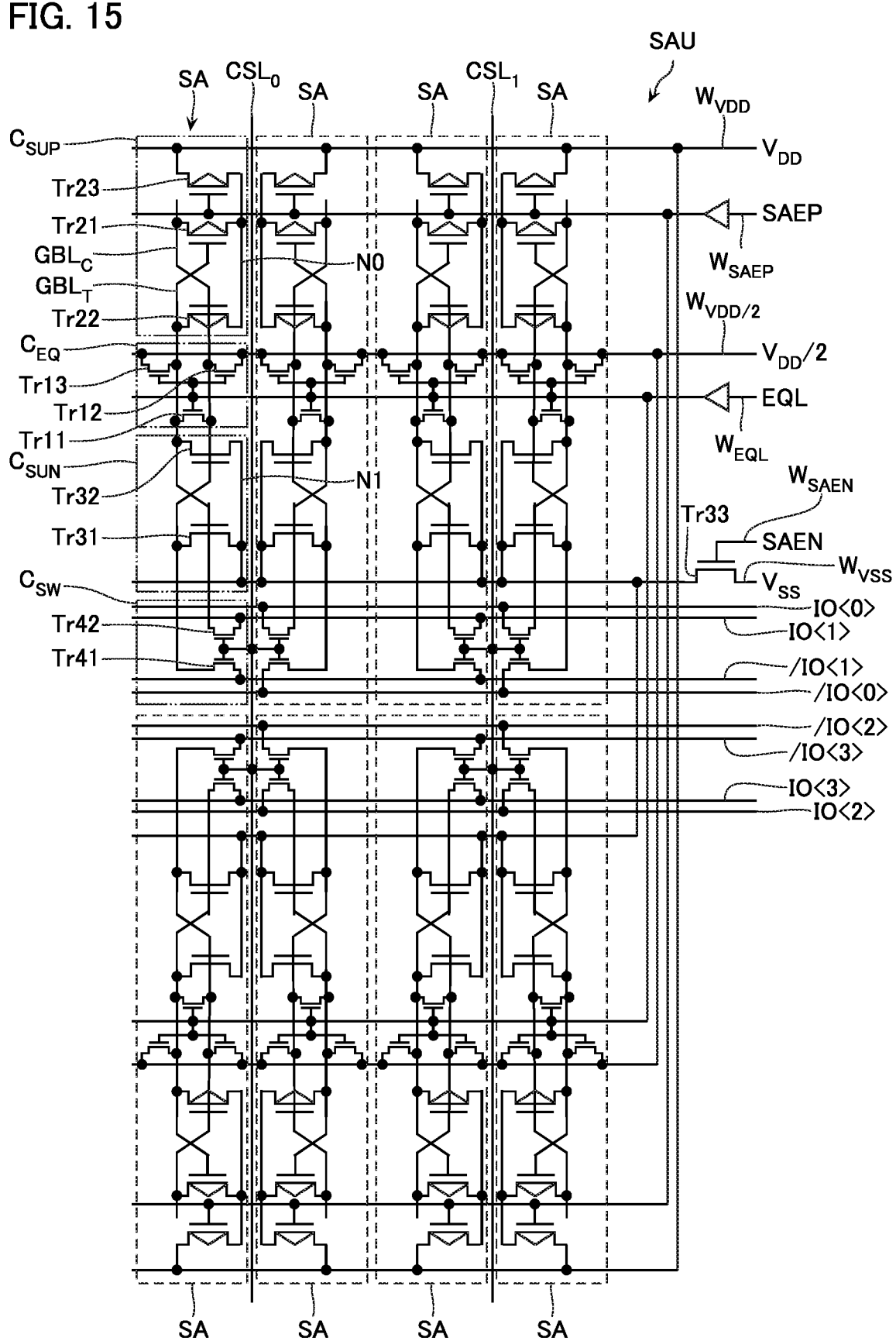
FIG. 15 is a schematic circuit diagram showing some of configurations of the sense amplifier unit SAU.

FIG. 15 is a schematic circuit diagram showing some of configurations of the sense amplifier unit SAU. FIG. 15 exemplifies some of the plurality of sense amplifiers SA included in the sense amplifier unit SAU.

As mentioned above, the sense amplifier unit SAU is provided in a region overlapping two of the sub arrays $MCA_S$ adjacent in the Y direction looking from the Z direction. Hereafter, the global bit line GBL corresponding to one of these two sub arrays $MCA_S$ will be called a global bit line $GBL_C$. Moreover, the global bit line GBL corresponding to the other of these two sub arrays $MCA_S$ will be called a global bit line $GBL_T$. The plurality of sense amplifiers SA included in the sense amplifier unit SAU are each connected to the global bit lines $GBL_C$, $GBL_T$.

Moreover, FIG. 15 illustrates: a voltage supply line $W_{VDD}$ supplying a voltage $V_{DD}$; a voltage supply line $W_{VDD/2}$ supplying a voltage $V_{DD}/2$ of half the magnitude of the voltage $V_{DD}$; and a voltage supply line $W_{VSS}$ supplying a ground voltage $V_{SS}$. These voltage supply lines $W_{VDD}$, $W_{VDD/2}$, $W_{VSS}$ are commonly connected to all of the sense amplifiers SA included in the sense amplifier unit SAU.

Moreover, FIG. 15 illustrates: signal supply lines $W_{SAEP}$, $W_{SAEN}$ supplying enable signals SAEP, SAEN of the sense amplifier SA; and a signal supply line $W_{EQL}$ supplying an equalize signal EQL of the sense amplifier SA. These signal supply lines $W_{SAEP}$, $W_{SAEN}$, $W_{EQL}$ are commonly connected to all of the sense amplifiers SA included in the sense amplifier unit SAU.

Moreover, FIG. 15 illustrates some of a plurality of column selection lines CSL (in the example of FIG. 15, column selection lines $CSL_0$, $CSL_1$). As described with reference to FIG. 14, for example, the sense amplifier unit SAU according to the present embodiment comprises a plurality of the sense amplifiers SA arranged in the X direction and the Y direction. Now, for example, the $2n+1^{th}$ (where n is an integer of 0 or more) four sense amplifiers SA counting from a negative side in the X direction and $2n+2^{th}$ four sense amplifiers SA counting from a negative side in the X direction, are assumed to be one group. In such a case, the sense amplifier unit SAU resultantly comprises a plurality of such groups. The plurality of column selection lines CSL are provided correspondingly to such a plurality of groups. These plurality of column selection lines CSL are each commonly connected to the eight sense amplifiers SA included in their corresponding group.

Moreover, FIG. 15 illustrates some of the plurality of data input/output signal lines IO, /IO (in the example of FIG. 15, the data input/output signal lines IO<0>-IO<3>, /IO<0>-/IO<3>). The plurality of data input/output signal lines IO, /IO are each commonly connected to all of the groups arranged in the X direction.

The sense amplifier unit SAU comprises: an equalizer circuit $C_{EQ}$ that equalizes voltages of the global bit lines $GBL_C$, $GBL_T$ during standby; amplifier circuits $C_{SUP}$, $C_{SUN}$ that differentially amplify signals of the global bit lines $GBL_C$, $GBL_T$ in a read operation, or the like; and a switch circuit $C_{SW}$ by which the global bit lines $GBL_C$, $GBL_T$ are made conductive with the data input/output signal lines IO, /IO in a read operation, or the like.

In the case of voltage of the signal supply line $W_{EQL}$ being "H", the equalizer circuit $C_{EQ}$ equalizes voltages of the global bit lines $GBL_C$, $GBL_T$. That is, it makes the global bit lines $GBL_C$, $GBL_T$ conductive with each other. Moreover, it makes the global bit lines $GBL_C$, $GBL_T$ conductive with the voltage supply line $W_{VDD/2}$.

Moreover, in the case of voltage of the signal supply line $W_{EQL}$ being "L", the equalizer circuit $C_{EQ}$ releases equalization of voltages of the global bit lines $GBL_C$, $GBL_T$. That is, it electrically isolates the global bit lines $GBL_C$, $GBL_T$ from each other. Moreover, it electrically isolates the global bit lines $GBL_C$, $GBL_T$ from the voltage supply line $W_{VDD/2}$.

The equalizer circuit $C_{EQ}$ comprises: a transistor Tr11 provided between the global bit lines $GBL_C$, $GBL_T$; a transistor Tr12 provided between the global bit line $GBL_C$ and the voltage supply line $W_{VDD/2}$; and a transistor Tr13 provided between the global bit line $GBL_T$ and the voltage supply line $W_{VDD/2}$. The transistors Tr11, Tr12, Tr13 are NMOS type field effect transistors, for example. Gate electrodes of the transistors Tr11, Tr12, Tr13 are connected to the signal supply line $W_{EQL}$.

In the case of voltage of the signal supply line $W_{SAEP}$ being "L" and voltage of the signal supply line $W_{SAEN}$ being "H", the amplifier circuits $C_{SUP}$, $C_{SUN}$ differentially amplify signals of the global bit lines $GBL_C$, $GBL_T$.

The amplifier circuit $C_{SUP}$ comprises: a transistor Tr21 provided between the global bit line $GBL_C$ and a node N0; a transistor Tr22 provided between the global bit line $GBL_T$ and the node N0; and a transistor Tr23 provided between the node N0 and the voltage supply line $W_{VDD}$. The transistors Tr21, Tr22, Tr23 are PMOS type field effect transistors, for example. A gate electrode of the transistor Tr21 is connected to the global bit line $GBL_T$. A gate electrode of the transistor Tr22 is connected to the global bit line $GBL_C$. A gate electrode of the transistor Tr23 is connected to the signal supply line $W_{SAEP}$.

The amplifier circuit $C_{SUN}$ comprises: a transistor Tr31 provided between the global bit line $GBL_C$ and a node N1; and a transistor Tr32 provided between the global bit line $GBL_T$ and the node N1. The node N1 is electrically connected to the voltage supply line $W_{VSS}$ via a transistor Tr33. The transistors Tr31, Tr32, Tr33 are NMOS type field effect transistors, for example. A gate electrode of the transistor Tr31 is connected to the global bit line $GBL_T$. A gate electrode of the transistor Tr32 is connected to the global bit line $GBL_C$. A gate electrode of the transistor Tr33 is connected to the signal supply line $W_{SAEN}$.

The switch circuit $C_{SW}$ comprises: a transistor Tr41 provided between the global bit line $GBL_C$ and the data input/output signal lines IO, /IO; and a transistor Tr42 provided between the global bit line $GBL_T$ and the data input/output signal lines IO, /IO. The transistors Tr41, Tr42 are NMOS type field effect transistors, for example. Gate electrodes of the transistor Tr41, Tr42 are connected to the plurality of column selection lines CSL.

Figure 16:
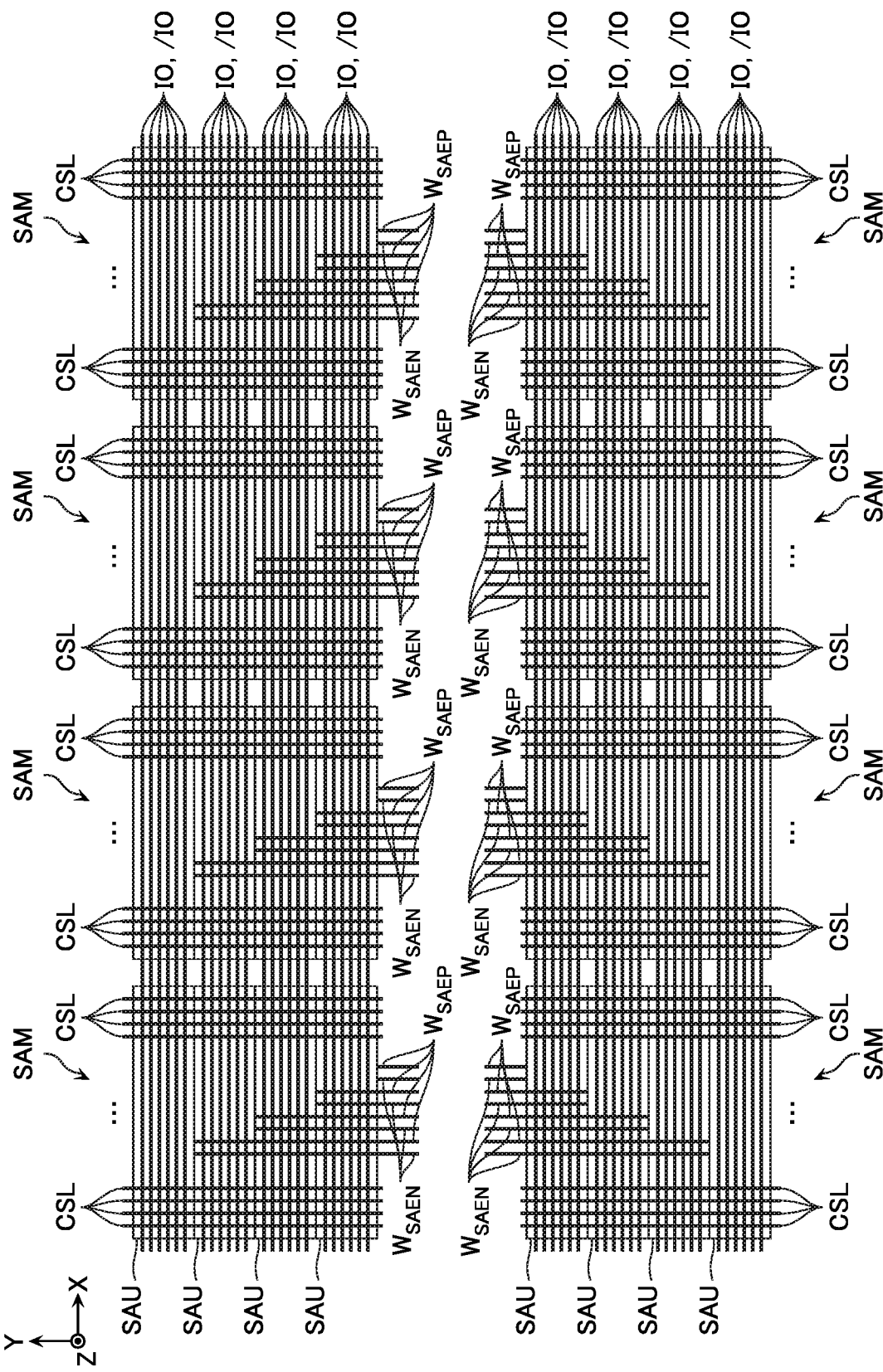
FIG. 16 is a schematic plan view showing some of configurations of the transistor layer $L_T$.

FIG. 16 is a schematic plan view showing some of configurations of the transistor layer $L_T$. The data input/output signal lines IO, /IO are each commonly connected to the plurality of sense amplifier units SAU arranged in the X direction, in the sense amplifier region $R_{SA}$. Moreover, the plurality of column selection lines CSL are each commonly connected to the plurality of sense amplifier units SAU arranged in the Y direction, in the sense amplifier region $R_{SA}$. Moreover, the signal supply lines $W_{SAEP}$, $W_{SAEN}$ are provided independently to each of the sense amplifier units SAU.

[Read Operation]

Figure 17:
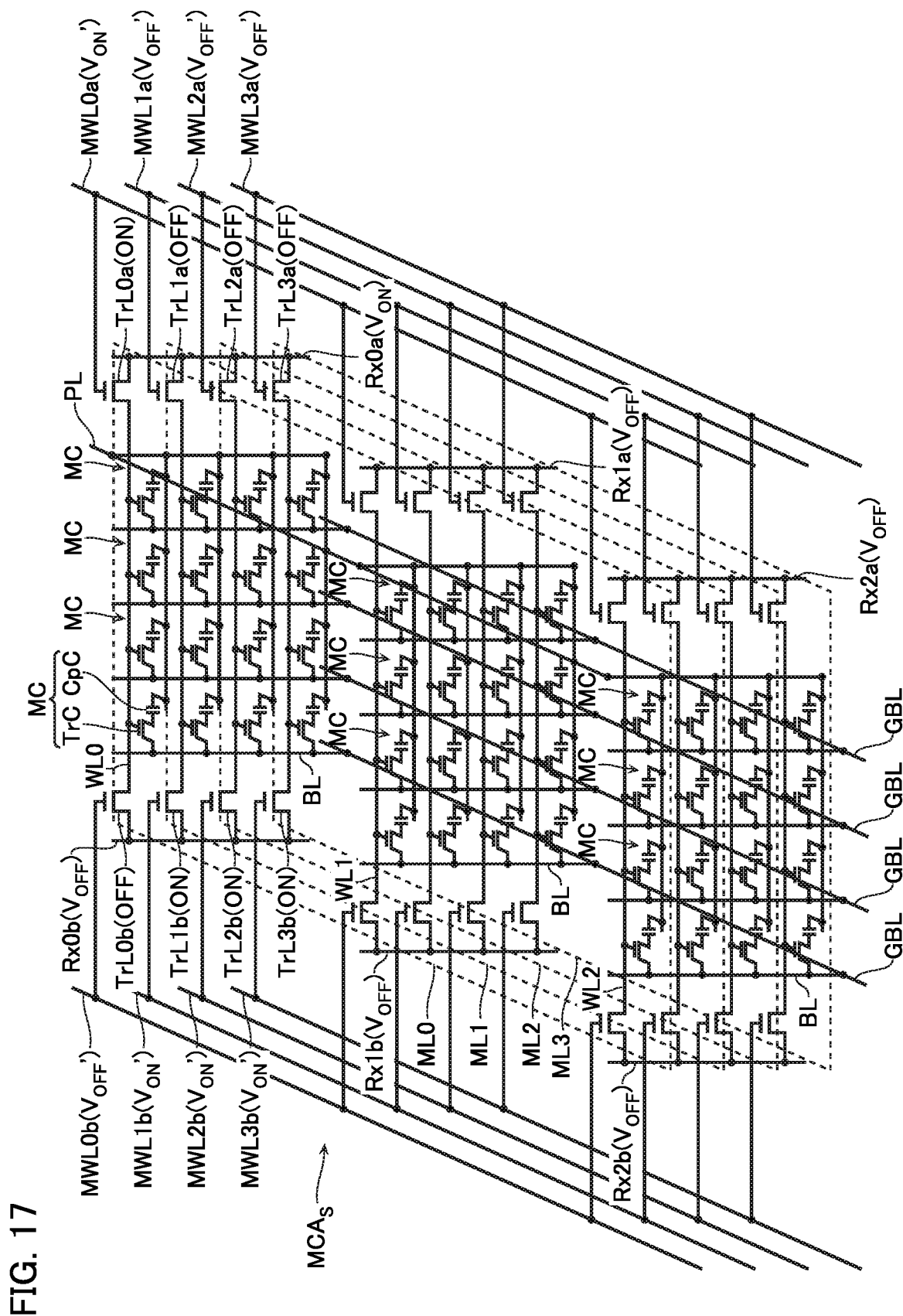
FIG. 17 is a schematic circuit diagram for explaining a read operation of the semiconductor memory device according to the first embodiment.

FIG. 17 is a schematic circuit diagram for explaining operation of the sub array $MCA_S$ in a read operation of the semiconductor memory device according to the first embodiment.

During the read operation, one of the plurality of memory layers ML0-ML3 is selected. In the example illustrated, the memory layer ML0 is selected. During selection of the memory layers ML0-ML3, the main word line MWL0a corresponding to the memory layer ML0 that is to be a target of the read operation, of the plurality of main word lines MWL0a, MWL1a, MWL2a, MWL3a is supplied with a voltage $V_{ON}'$, and the other main word lines MWL1a, MWL2a, MWL3a are supplied with a voltage $V_{OFF}'$, for example. Moreover, the main word line MWL0b corresponding to the memory layer ML0 that is to be a target of the read operation, of the plurality of main word lines MWL0b, MWL1b, MWL2b, MWL3b is supplied with the voltage $V_{OFF}'$, and the other main word lines MWL1b, MWL2b, MWL3b are supplied with the voltage $V_{ON}'$, for example.

The voltage $V_{ON}'$ has a magnitude sufficient to set the transistor TrL to an ON state, for example. The voltage $V_{OFF}'$ has a magnitude sufficient to set the transistor TrL to an OFF state, for example. When the transistor TrL is an NMOS transistor, for example, the voltage $V_{ON}'$ is larger than the voltage $V^{OFF'}$. Moreover, when the transistor TrL is a PMOS transistor, for example, the voltage $V_{ON}'$ is smaller than the voltage $V_{OFF}'$. Note that hereafter, an example where the transistor TrL is an NMOS transistor will be described.

Moreover, during the read operation, one of the plurality of word lines WL0-WL2 is selected. In the example illustrated, the word line WL0 is selected. During selection of the word lines WL0-WL2, the row selection line Rx0a corresponding to the word line WL0 that is to be a target of the read operation, of the plurality of row selection lines Rx0a, Rx1a, Rx2a is supplied with a voltage $V_{ON}$, and the other row selection lines Rx1a, Rx2a are supplied with a voltage $V_{OFF}$, for example. Moreover, the plurality of row selection lines Rx0b, Rx1b, Rx2b are supplied with the voltage $V_{OFF}$, for example.

The voltage $V_{ON}$ has a magnitude sufficient to set the transistor TrC to an ON state, for example. The voltage $V_{OFF}$ has a magnitude sufficient to set the transistor TrC to an OFF state, for example. When the transistor TrC is an NMOS transistor, for example, the voltage $V_{ON}$ is larger than the voltage $V_{OFF}$. Moreover, when the transistor TrC is a PMOS transistor, for example, the voltage $V_{ON}$ is smaller than the voltage $V_{OFF}$. Note that hereafter, an example where the transistor TrC is an NMOS transistor will be described.

Now, the word line WL0 (hereafter, called "selected word line WL0") connected to the memory cell MC that is a target of the read operation (hereafter, called "selected memory cell MC") is supplied with the voltage $V_{ON}$ via the transistor TrL0a. As a result, the transistor TrC in the selected memory cell MC attains an ON state. Accordingly, voltage of the global bit line GBL changes or current flows in the global bit line GBL. Detecting this change in voltage or current makes it possible for data stored in the selected memory cell MC to be read.

Moreover, the word lines WL1, WL2 other than the selected word line WL0 (hereafter, called "non-selected word lines WL1, WL2") corresponding to the same memory layer ML0 as that of the selected memory cell MC are supplied with the voltage $V_{OFF}$ via the transistors TrL0a. As a result, the transistors TrC in the memory cells MC attain an OFF state.

Moreover, non-selected word lines WL0, WL1, WL2 corresponding to different memory layers ML1, ML2, ML3 from that of the selected memory cell MC are supplied with the voltage $V_{OFF}$ via the transistors TrL1b, TrL2b, TrL3b. As a result, the transistors TrC in the memory cells MC attain an OFF state.

FIGS. 18-22 are schematic circuit diagrams for explaining operation of the sense amplifier unit SAU in the read operation of the semiconductor memory device according to the first embodiment.

Figure 18:
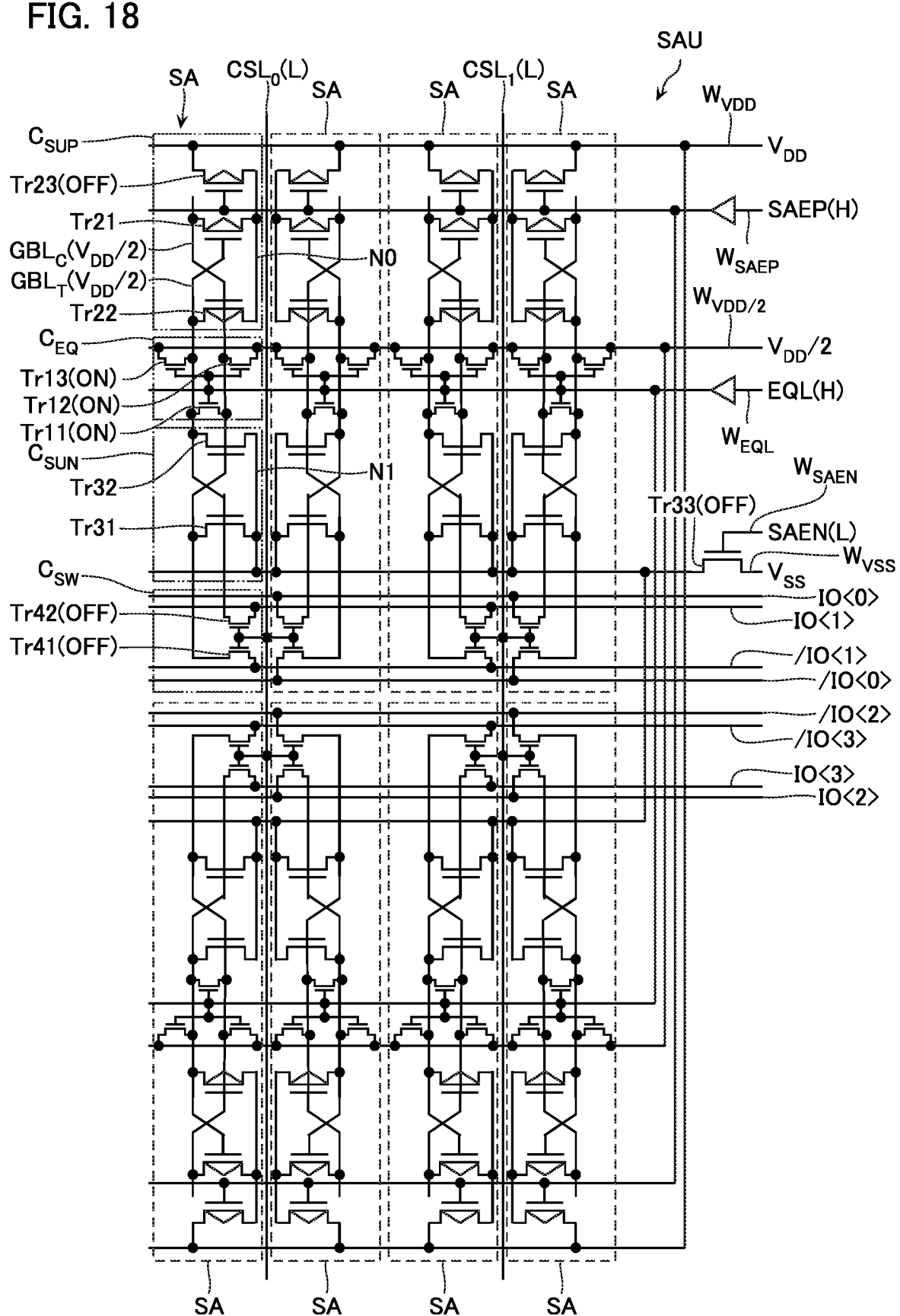
FIG. 18 is a schematic circuit diagram for explaining same read operation.

As shown in FIG. 18, in a standby state prior to read operation execution, voltages of the column selection line CSL and signal supply lines $W_{SAEP}$, $W_{SAEN}$, $W_{EQL}$ are respectively "L, H, L, H". In this state, the transistors Tr11, Tr12, Tr13 are in an ON state, and voltages of the global bit lines $GBL_C$, $GBL_T$ are equalized to voltage $V_{DD}/2$.

Figure 19:
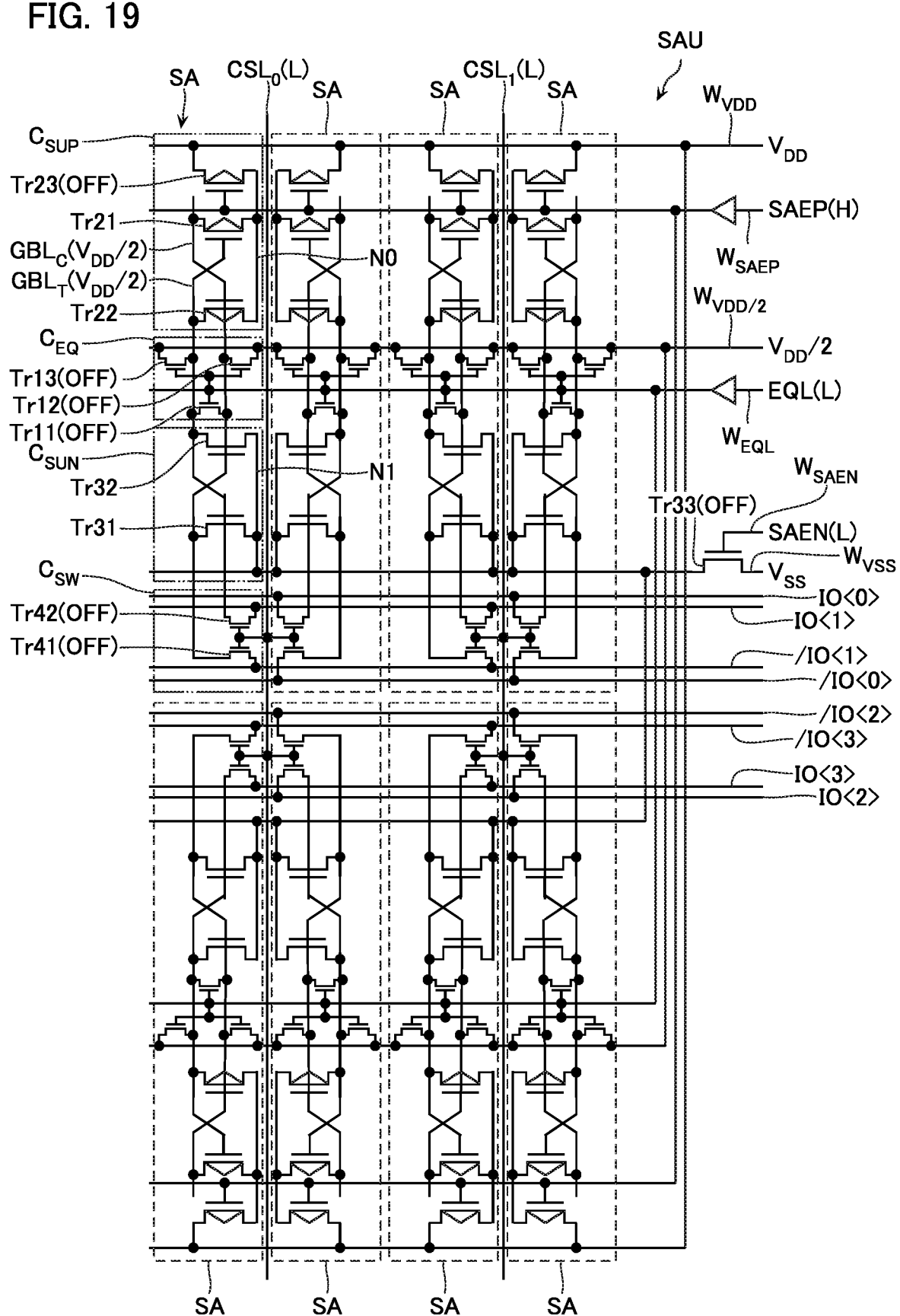
FIG. 19 is a schematic circuit diagram for explaining same read operation.

During the read operation, as shown in FIG. 19, equalization of voltages of the global bit lines $GBL_C$, $GBL_T$ is released. For example, voltage of the signal supply line $W_{EQL}$ is set to "L". Accordingly, the transistors Tr11, Tr12, Tr13 attain an OFF state.

Figure 20:
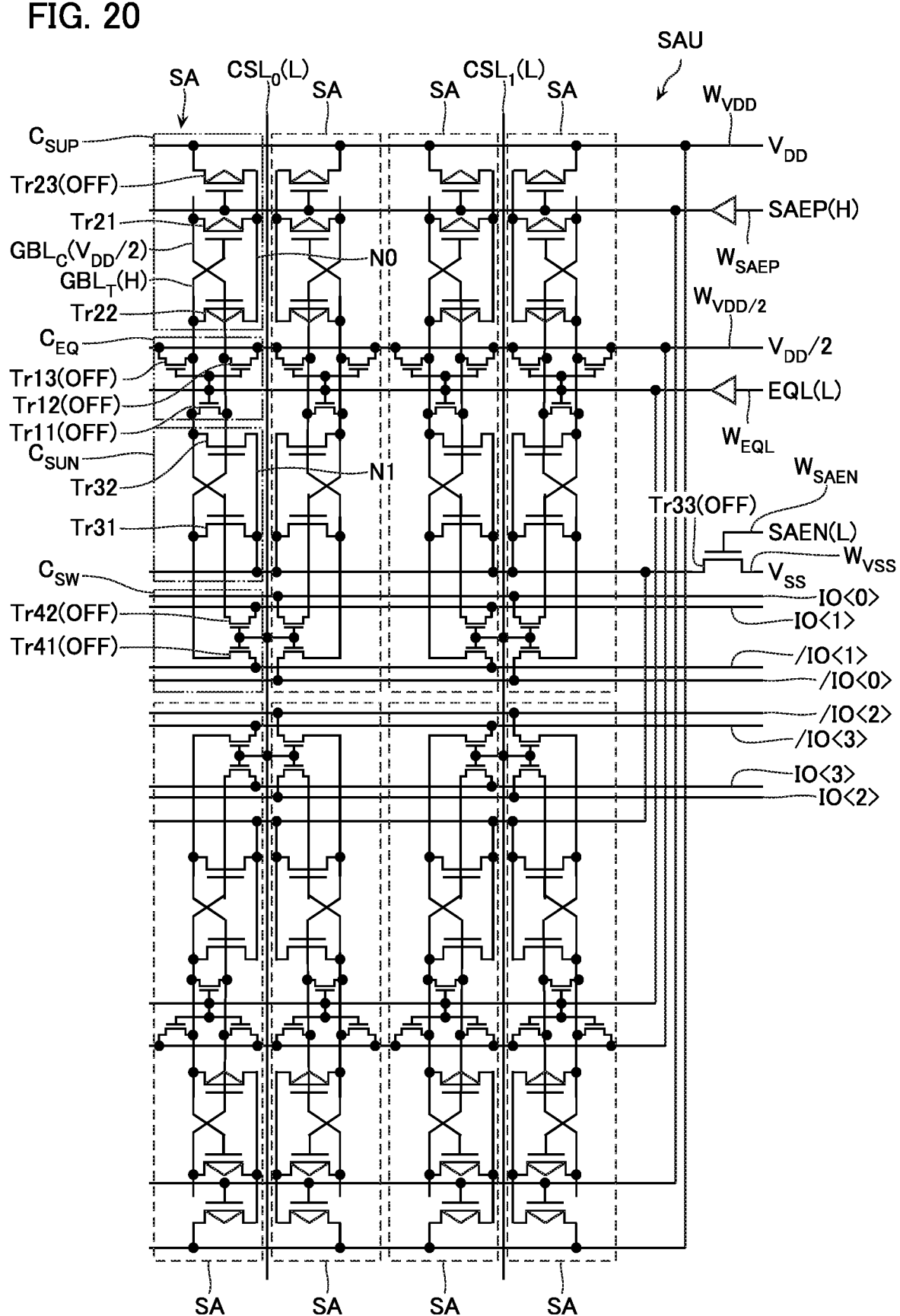
FIG. 20 is a schematic circuit diagram for explaining same read operation.

Moreover, during the read operation, as shown in FIG. 20, data in the memory cell MC is read to the global bit line GBL. For example, as described with reference to FIG. 17, one of the plurality of memory layers ML0-ML3 is selected, one of the plurality of word lines WL0-WL2 is selected, and in all of the corresponding memory cells MC, the transistor TrC is set to an ON state.

Note that FIG. 20 shows an example where the sub array $MCA_S$ corresponding to the global bit line $GBL_T$, of the two global bit lines $GBL_C$, $GBL_T$ corresponding to the sense amplifier unit SAU, is selected. Hence, in the example of FIG. 20, voltage of the global bit line $GBL_C$ is maintained at voltage $V_{DD}/2$, and voltage of the global bit line $GBL_T$ changes. However, the sub array $MCA_S$ corresponding to the global bit line $GBL_C$ may be selected. In this case, voltage of the global bit line $GBL_C$ changes, and voltage of the global bit line $GBL_T$ is maintained at voltage $V_{DD}/2$.

Note that FIG. 20 shows an example where the capacitor CpC of the selected memory cell MC is charged by $V_{DD}$. In this case, voltage of the global bit line GBL becomes larger than voltage $V_{DD}/2$. However, the capacitor CpC of the selected memory cell MC may be discharged to the ground voltage $V_{SS}$. In this case, voltage of the global bit line GBL becomes smaller than voltage $V_{DD}/2$.

Figure 21:
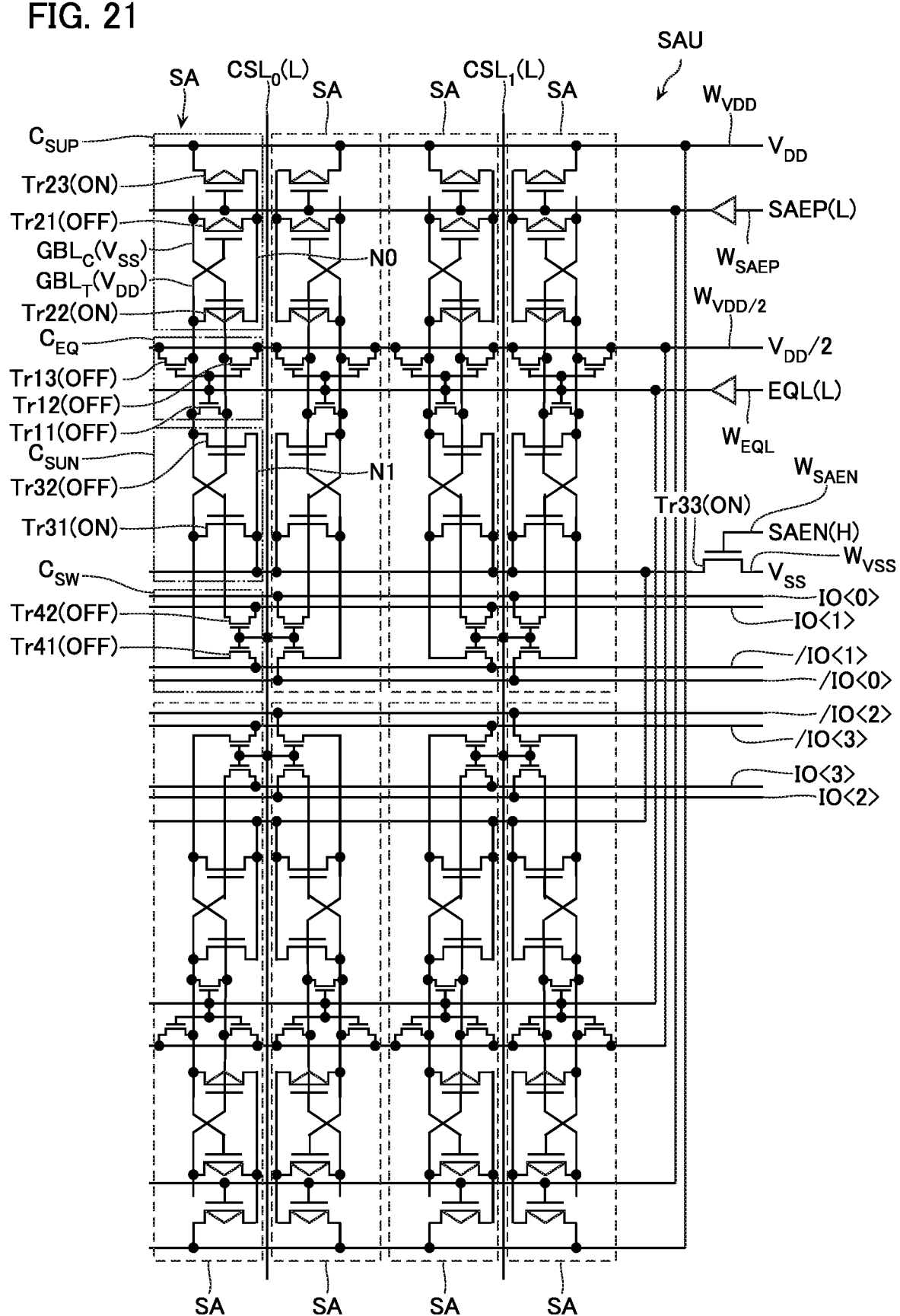
FIG. 21 is a schematic circuit diagram for explaining same read operation.

Moreover, during the read operation, as shown in FIG. 21, signals of the global bit lines $GBL_C$, $GBL_T$ are differentially amplified. For example, voltage of the signal supply line $W_{SAEP}$ is set to "L", and voltage of the signal supply line $W_{SAEN}$ is set to "H". Accordingly, the transistors Tr23, Tr33 attain an ON state.

Now, in the example of FIG. 21, voltage of the global bit line $GBL_T$ is larger than voltage $V_{DD}/2$. Hence, when the transistors Tr23, Tr33 attain an ON state, the transistors Tr22, Tr31 attain an ON state, and the transistors Tr21, Tr32 attain an OFF state. Accordingly, voltage of the global bit line $GBL_T$ increases to voltage $V_{DD}$. Moreover, voltage of the global bit line $GBL_C$ decreases to the ground voltage $V_{SS}$.

Note that as described with reference to FIG. 16, the signal supply lines $W_{SAEP}$, $W_{SAEN}$ are provided independently to each of the sense amplifier units SAU. In a step corresponding to FIG. 21, voltage of solely the signal supply line $W_{SAEP}$ corresponding to the selected sense amplifier unit SAU is set to "L". Moreover, voltage of solely the signal supply line $W_{SAEN}$ corresponding to the selected sense amplifier unit SAU is set to "H".

Figure 22:
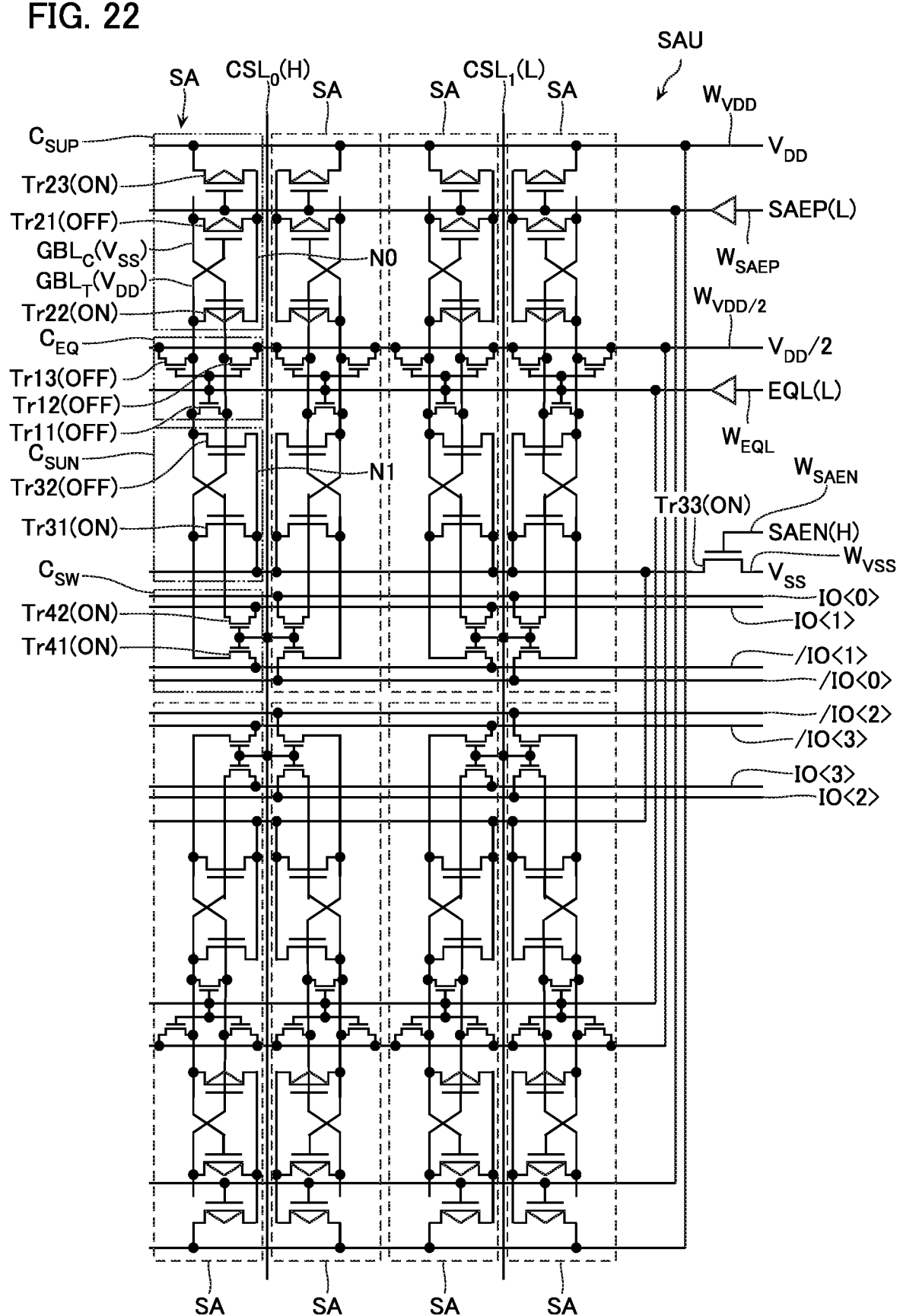
FIG. 22 is a schematic circuit diagram for explaining same read operation.

Moreover, during the read operation, as shown in FIG. 22, the global bit lines $GBL_C$, $GBL_T$ are made conductive with the data input/output signal lines IO, /IO. For example, voltage of one of the plurality of column selection lines CSL (in the example of FIG. 22, the column selection line $CSL_0$) is set to "H". Accordingly, the transistor Tr41 attains an ON state, and the global bit line $GBL_C$ and data input/output signal line /IO are conductive. Moreover, the transistor Tr42 attains an ON state, and the global bit line $GBL_T$ and data input/output signal line IO are conductive.

[Advantages]

As described with reference to FIG. 4, in the semiconductor memory device according to the first embodiment, pluralities of the row selection lines Rx are each electrically commonly connected among a plurality of the sub arrays $MCA_S$ arranged in the X direction, in the wiring common region $R_{WC}$. Moreover, these pluralities of row selection lines Rx are respectively connected to unillustrated driver circuits. Such a configuration makes it possible for circuit area required for the driver circuits to be significantly reduced compared to when the row selection lines Rx are provided to each of the sub arrays $MCA_S$, for example.

Moreover, as described with reference to FIG. 4, in the semiconductor memory device according to the first embodiment, pluralities of the main word lines MWL are each electrically commonly connected among a plurality of the sub arrays $MCA_S$ arranged in the Y direction, in the wiring common region $R_{WC}$. These pluralities of main word lines MWL are respectively connected to the driver circuits $DRV_{MWL}$ described with reference to FIG. 13. Such a configuration makes it possible for circuit area required for the driver circuits $DRV_{MWL}$ to be significantly reduced compared to when the driver circuits $DRV_{MWL}$ are provided to each of the sub arrays $MCA_S$, for example.

Moreover, as described with reference to FIG. 5, and so on, the semiconductor memory device according to the present embodiment comprises the plurality of memory layers ML0-ML3 arranged in the Z direction. Moreover, as described with reference to FIG. 12, and so on, these plurality of memory layers ML0-ML3 each comprise the conductive layer 150. Moreover, these conductive layers 150 are connected with the contact electrodes 107. Now, in the case where, for example, each of the sub arrays $MCA_S$ is provided with contact electrodes 107 corresponding to all of the memory layers ML arranged in the Z direction, the larger the number of memory layers ML arranged in the Z direction becomes, the greater the number of contact electrodes 107 required will end up becoming, and the larger an area required for disposing the contact electrodes 107 will end up becoming. Accordingly, area of the sub array column $MCA_C$ will sometimes end up increasing.

Let there be supposed a configuration of the kind where, for example, the contact electrodes 107 are arranged in the Y direction along the conductive layer 150 and pitch in the Y direction of the contact electrodes 107 is the same as pitch of the conductive layers 120. Moreover, let there be supposed the case where, for example, the number of word lines WL (conductive layers 120) arranged in the Y direction is 64 in the sub array $MCA_S$.

In the case where, for example, the number of memory layers ML arranged in the Z direction is 64, 64 of the contact electrodes 107 will be required. In this case, it is possible for the 64 contact electrodes to be kept within a range of each of the sub arrays $MCA_S$, even when these 64 contact electrodes are arranged in a single line in the Y direction.

However, in the case where, for example, the number of memory layers ML arranged in the Z direction is 128, 128 of the contact electrodes 107 will be required. In this case, if the 128 contact electrodes 107 end up being arranged in a single line in the Y direction, these 128 contact electrodes 107 cannot be kept within a range of each of the sub arrays $MCA_S$. Conceivably, in such a case, the 128 contact electrodes will be arranged 64 at a time in the Y direction, divided into two columns. In this case, a width in the X direction of a region required for disposing the contact electrodes 107 will end up being twice that of the case of 64 memory layers ML. As a result, widths in the X direction of all of the sub arrays $MCA_S$ will end up increasing, and area of the sub array column $MCA_C$ will end up increasing.

Furthermore, in the case where, for example, the number of memory layers ML arranged in the Z direction is 256, 256 of the contact electrodes 107 will be required. In this case, for similar reasons, a width in the X direction of a region required for disposing the contact electrodes 107 will end up being four times that of the case of 64 memory layers ML. As a result, widths in the X direction of all of the sub arrays $MCA_S$ will end up increasing, and area of the sub array column $MCA_C$ will end up increasing.

Accordingly, in the semiconductor memory device according to the first embodiment, the conductive layers 150 each extend in the Y direction across a plurality of the sub arrays $MCA_S$ arranged in the Y direction, in the wiring common region $R_{WC}$. Moreover, the end portion in the Y direction of each sub array column $MCA_C$ is provided with the hookup region $R_{HU}$, and the contact electrodes 107 disposed therein. In such a configuration, area of the hookup region $R_{HU}$ will increase if the number of memory layers ML arranged in the Z direction increases. However, unlike the case where each of the sub arrays $MCA_S$ is provided with contact electrodes 107 corresponding to all of the memory layers ML arranged in the Z direction, area of the sub arrays $MCA_S$ will not increase. It is therefore possible for the above-mentioned effects of increase in area to be significantly suppressed. For example, in the case of 128 sub arrays $MCA_S$ being included in the sub array column $MCA_C$, an amount of increase in area of the sub array column $MCA_C$ can be suppressed to a $\frac{1}{128}^{th}$ degree.

Second Embodiment

Next, a semiconductor memory device according to a second embodiment will be described. In the following description, portions similar to in the first embodiment will be assigned with the same symbols as in the first embodiment, and descriptions thereof omitted.

Figure 23:
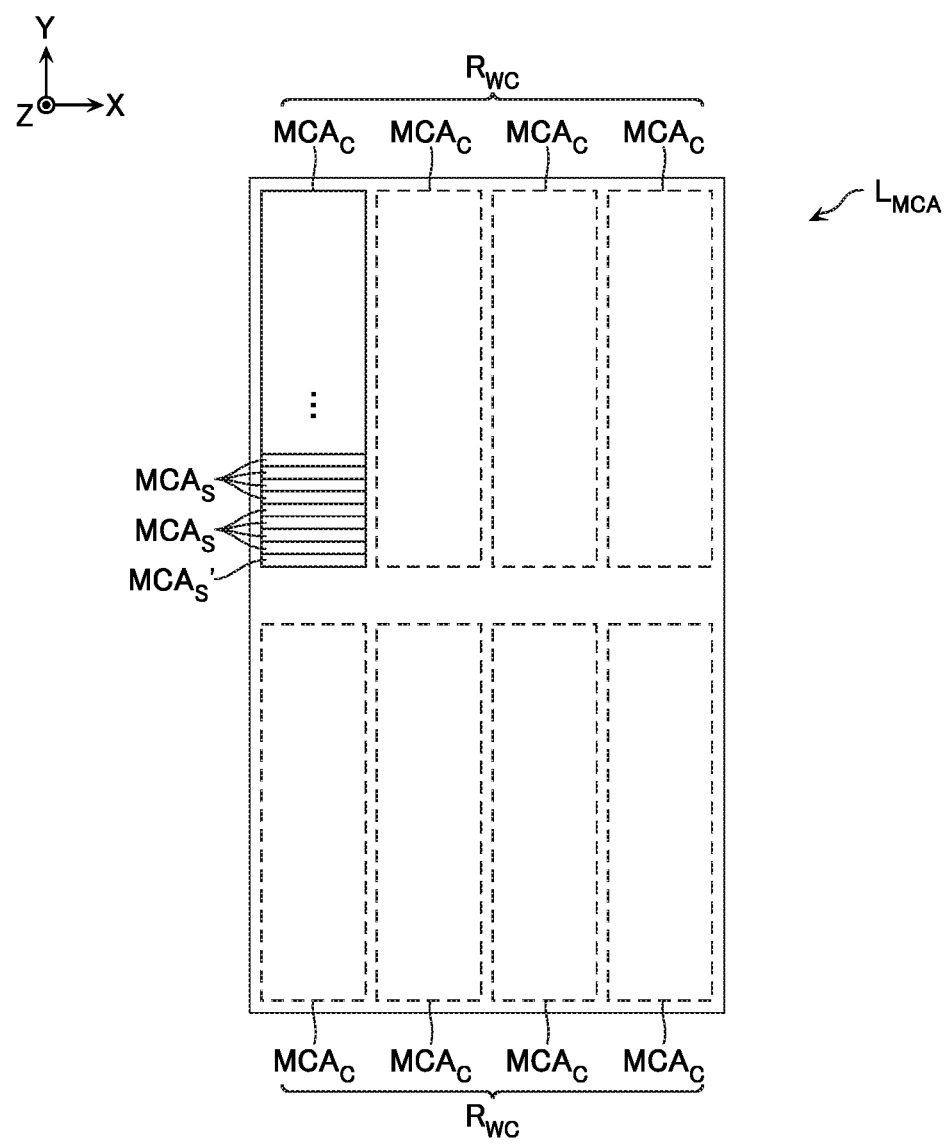
FIG. 23 is a schematic plan view showing configurations of a memory cell array layer $L_{MCA}$ of a semiconductor memory device according to a second embodiment.

FIG. 23 is a schematic plan view showing configurations of a memory cell array layer $L_{MCA}$ of a semiconductor memory device according to the second embodiment. The semiconductor memory device according to the second embodiment is basically configured similarly to that of the first embodiment. However, the semiconductor memory device according to the second embodiment comprises a sub array $MCA_S{'}$ instead of the hookup region $R_{HU}$.

Figure 24:
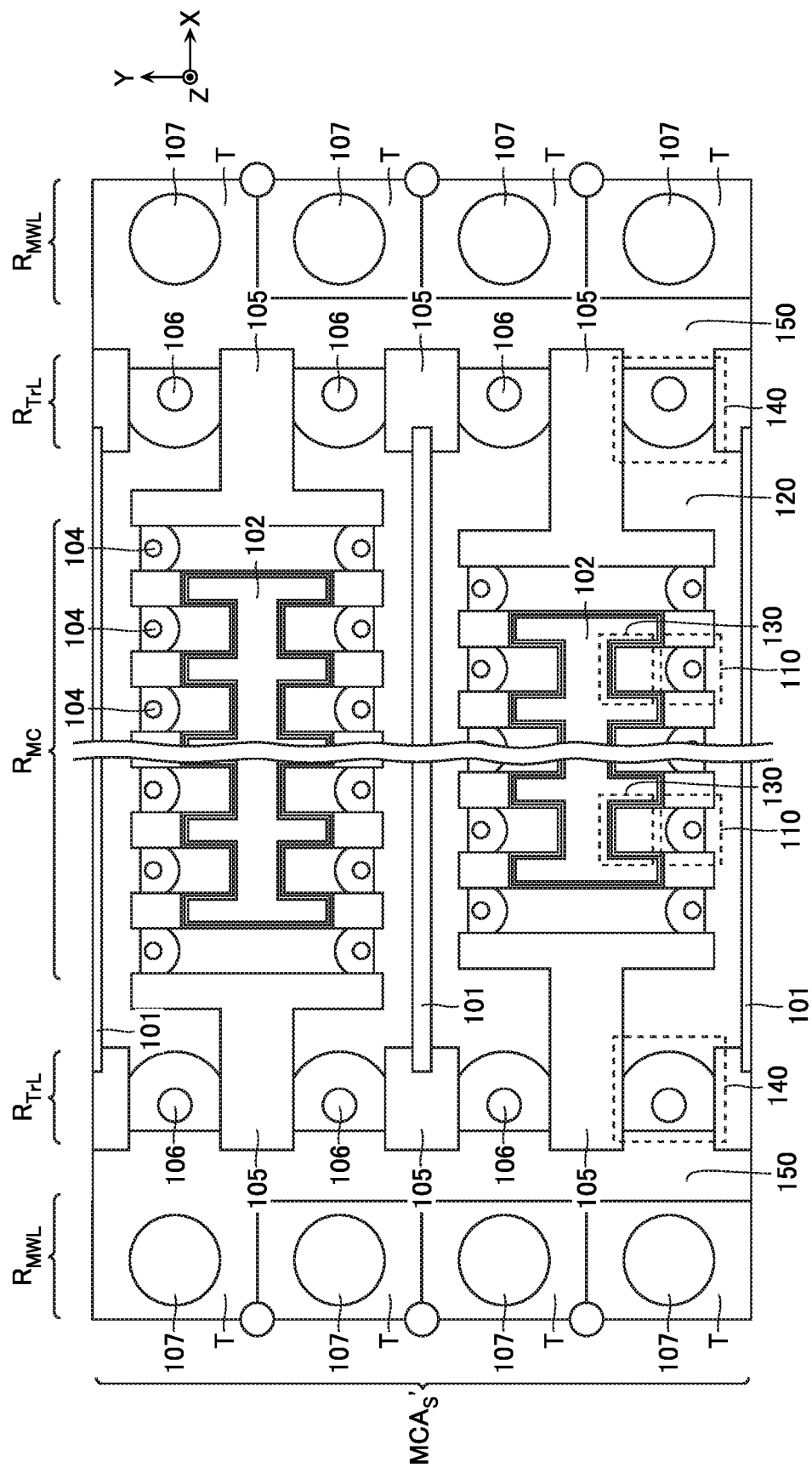
FIG. 24 is a schematic XY cross-sectional view showing some of configurations of a sub array $MCA_S'$.
Figure 25:
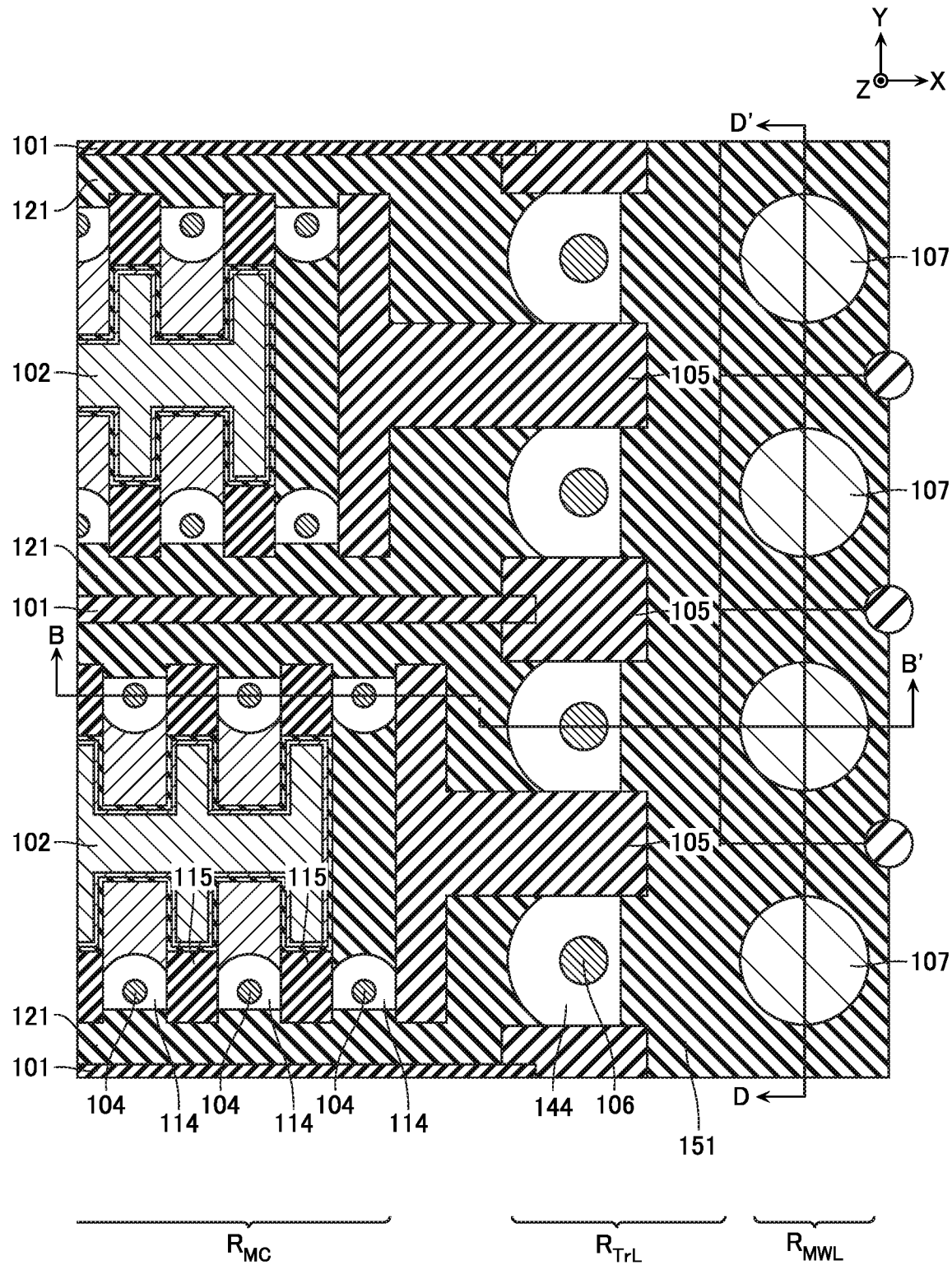
FIG. 25 is a schematic XY cross-sectional view showing some of configurations of the sub array $MCA_S'$.
Figure 26:
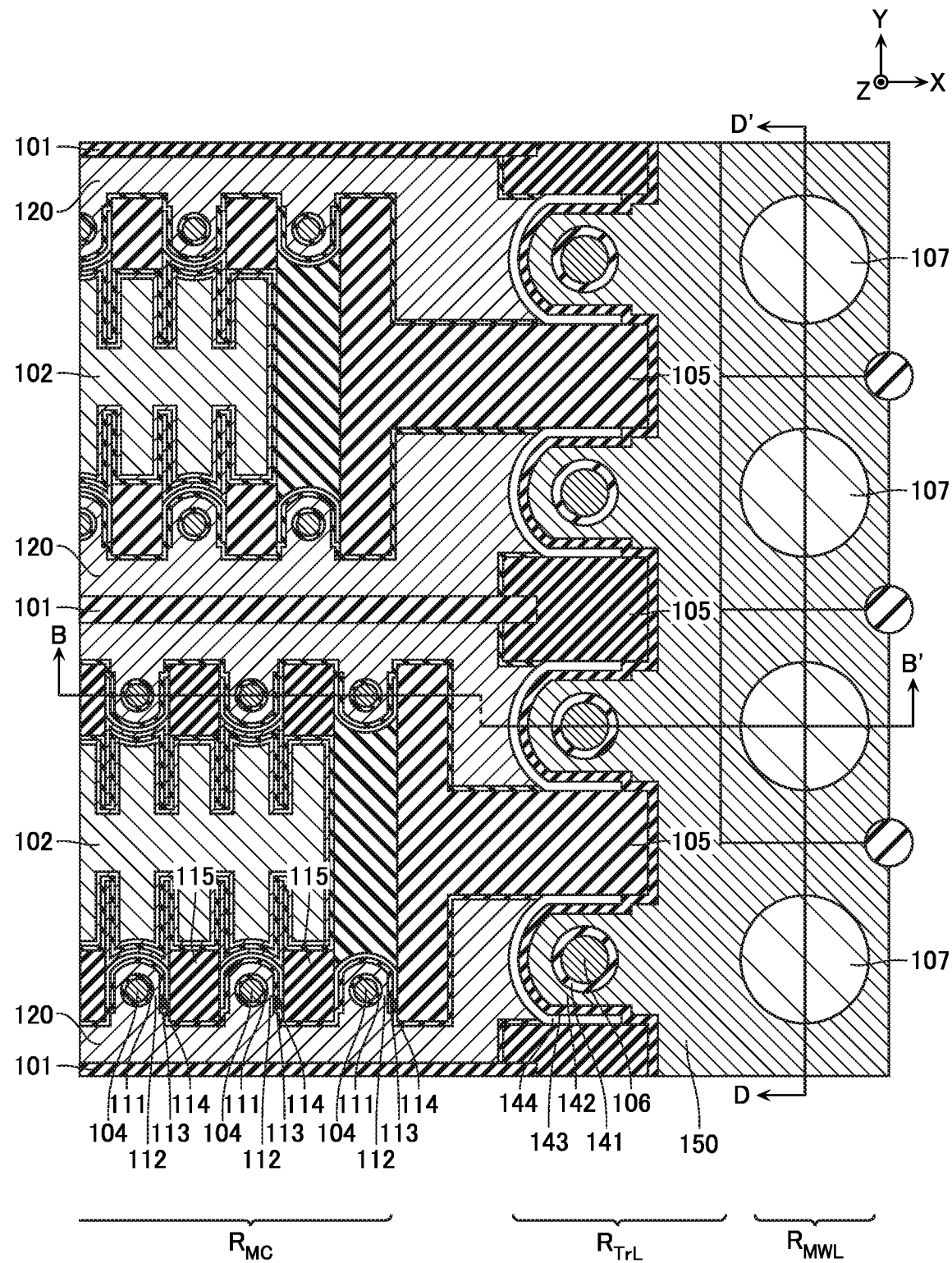
FIG. 26 is a schematic XY cross-sectional view showing some of configurations of the sub array $MCA_S'$.
Figure 27:
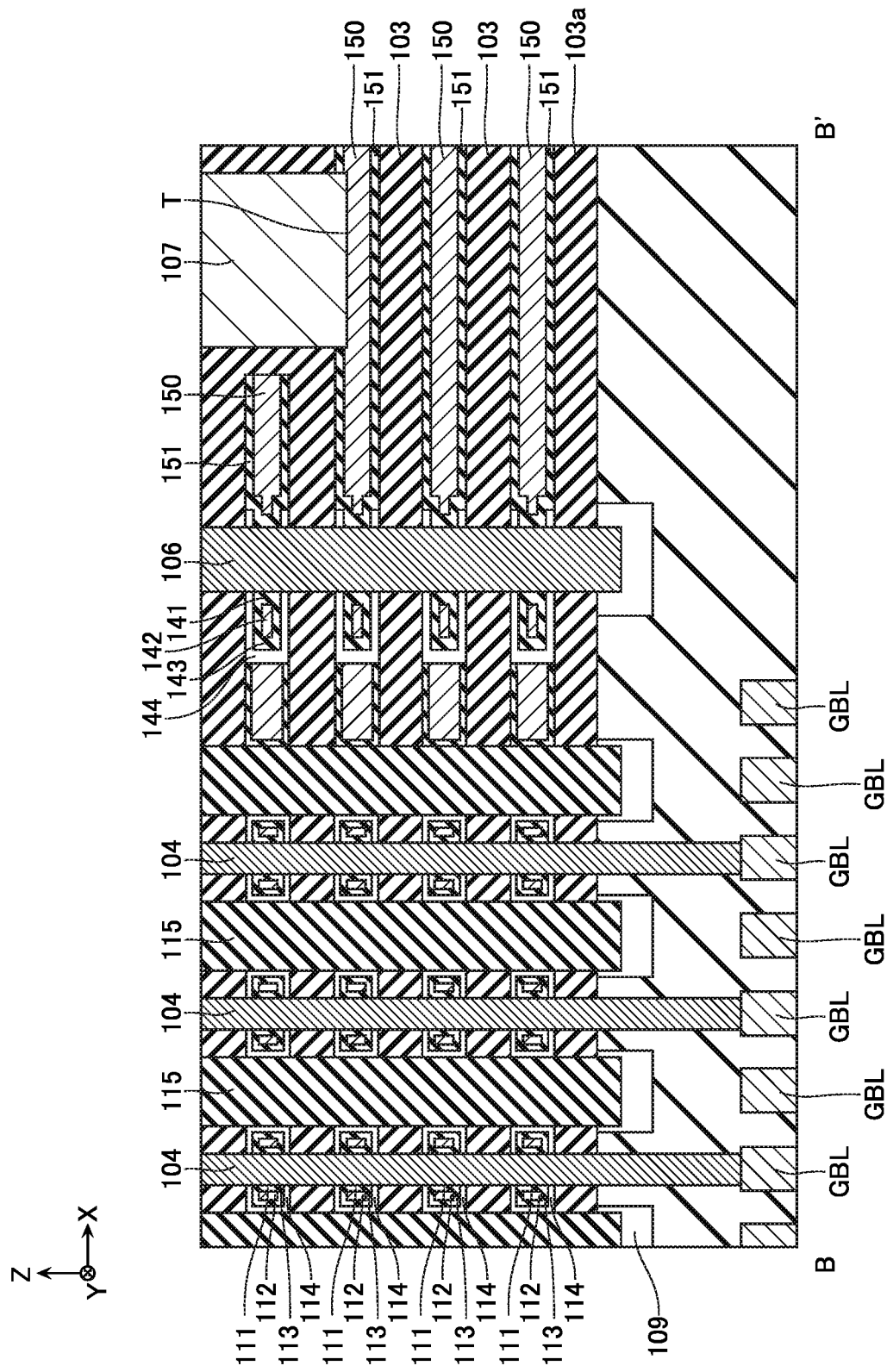
FIG. 27 is a schematic XZ cross-sectional view in which the configurations shown in FIGS. 25 and 26 have been cut along the line B-B' and viewed along a direction of the arrows.
Figure 28:
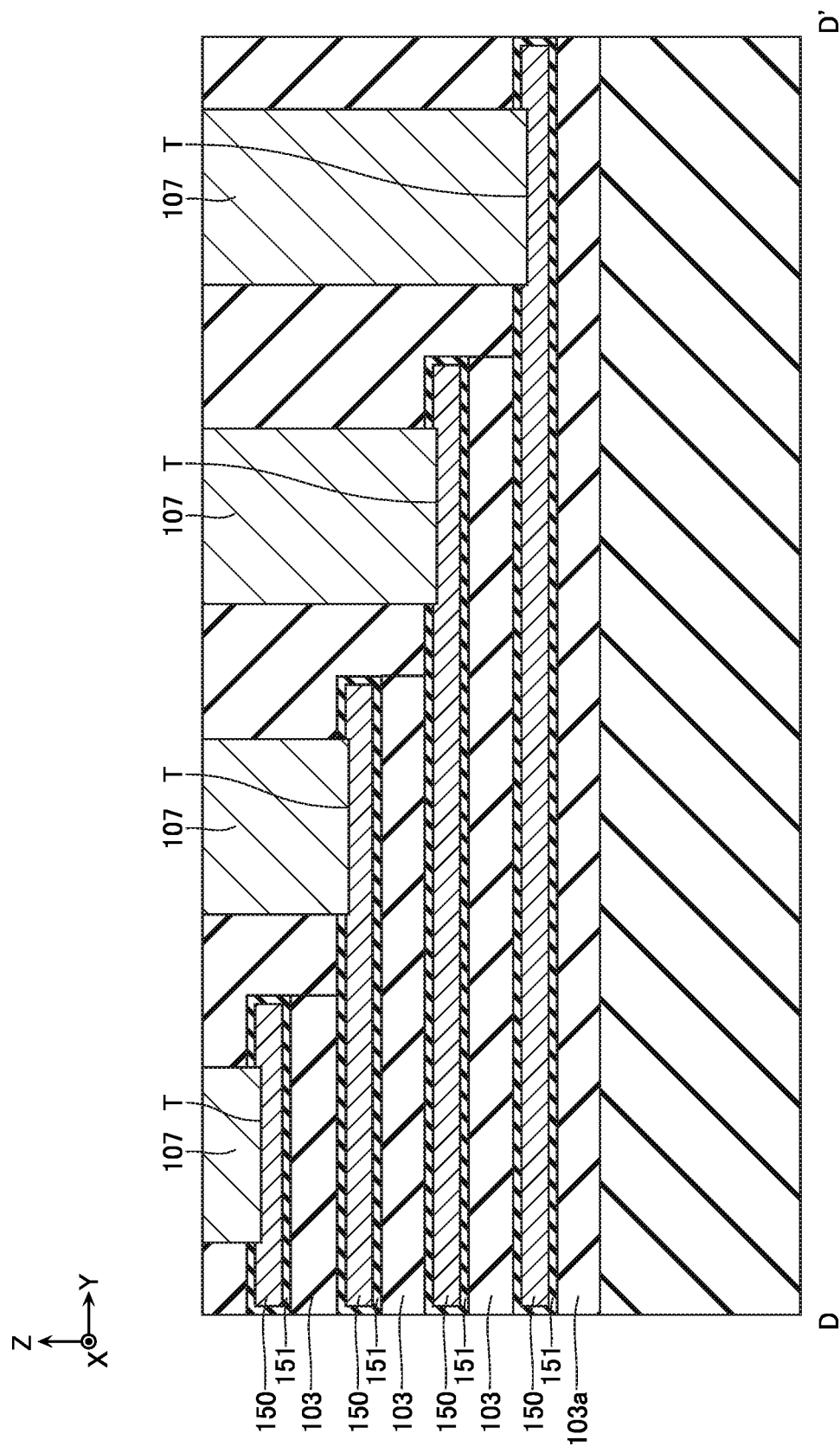
FIG. 28 is a schematic YZ cross-sectional view in which the configurations shown in FIGS. 25 and 26 have been cut along the line D-D' and viewed along a direction of the arrows.

FIG. 24 is a schematic XY cross-sectional view showing some of configurations of the sub array $MCA_S{'}$. Note that in FIG. 24, some of configurations (the insulating layers 121, 151) are omitted. FIGS. 25 and 26 are schematic XY cross-sectional views showing some of configurations of the sub array $MCA_S{'}$. Note that FIGS. 25 and 26 show XY cross sections at different height positions. FIG. 27 is a schematic XZ cross-sectional view in which the configurations shown in FIGS. 25 and 26 have been cut along the line B-B' and viewed along a direction of the arrows. FIG. 28 is a schematic YZ cross-sectional view in which the configurations shown in FIGS. 25 and 26 have been cut along the line D-D' and viewed along a direction of the arrows.

As shown in FIGS. 24-28, the sub array $MCA_S'$ is basically configured similarly to the sub array $MCA_S$.

However, in the main word line region $R_{MWL}$ of the sub array $MCA_S'$, the memory layers ML0-ML3 comprise the terrace portion T of the conductive layer 150.

Moreover, the main word line region $R_{MWL}$ of the sub array $MCA_S'$ is provided with a plurality of the contact electrodes 107 arranged in the Y direction. As shown in FIG. 27, the contact electrode 107 extends in the Z direction and has its lower end connected to the terrace portion T of the conductive layer 150. Moreover, as shown in FIG. 28, the plurality of contact electrodes 107 arranged in the Y direction are respectively connected to conductive layers 150 provided at different height positions.

Note that in the example of FIG. 23, the sub array columns $MCA_C$ each comprise one sub array $MCA_S'$. However, it is possible too for the number of sub arrays $MCA_S'$ included in each sub array column $MCA_C$ to be increased when, for example, the number of memory layers ML arranged in the Z direction is a certain number or more. Such a method makes it possible for increase in width in the X direction of the sub arrays $MCA_S$ to be suppressed and increase in area of the sub array column $MCA_C$ to thereby be suppressed, even when the number of memory layers ML arranged in the Z direction increases.

Let there be supposed a configuration of the kind where, for example, as shown in FIGS. 24-26, pitch in the Y direction of the contact electrodes 107 is the same as pitch of the conductive layers 120. Moreover, let there be supposed the case where, for example, the number of word lines WL (conductive layers 120) arranged in the Y direction is 64 in the sub array $MCA_S$.

In the case where, for example, the number of memory layers ML arranged in the Z direction is 64, 64 of the contact electrodes 107 will be required. In this case, it is possible for the 64 contact electrodes 107 to be kept within a range of one sub array $MCA_S'$, even when these 64 contact electrodes are arranged in a single line in the Y direction. In such a case, the sub array columns $MCA_C$ need only each comprise one sub array $MCA_S'$.

On the other hand, in the case where, for example, the number of memory layers ML arranged in the Z direction is 128, 128 of the contact electrodes 107 will be required. In this case, if the 128 contact electrodes 107 end up being arranged in a single line in the Y direction, these 128 contact electrodes 107 cannot be kept within a range of the sub array $MCA_S'$. In such a case, the sub array columns $MCA_C$ may each comprise two sub arrays $MCA_S'$. Moreover, in one of the sub arrays $MCA_S'$, there may be disposed the contact electrodes 107 corresponding to the $1^{st}$ through $64^{th}$ memory layers ML, and in the other of the sub arrays $MCA_S'$, there may be disposed the contact electrodes 107 corresponding to the $65^{th}$ through $128^{th}$ memory layers ML. This makes it possible for increase in width in the X direction of the sub arrays $MCA_S$ to be suppressed and increase in area of the sub array column $MCA_C$ to be suppressed.

Third Embodiment

Next, a semiconductor memory device according to a third embodiment will be described. In the following description, portions similar to in the first embodiment will be assigned with the same symbols as in the first embodiment, and descriptions thereof omitted.

Figure 29:
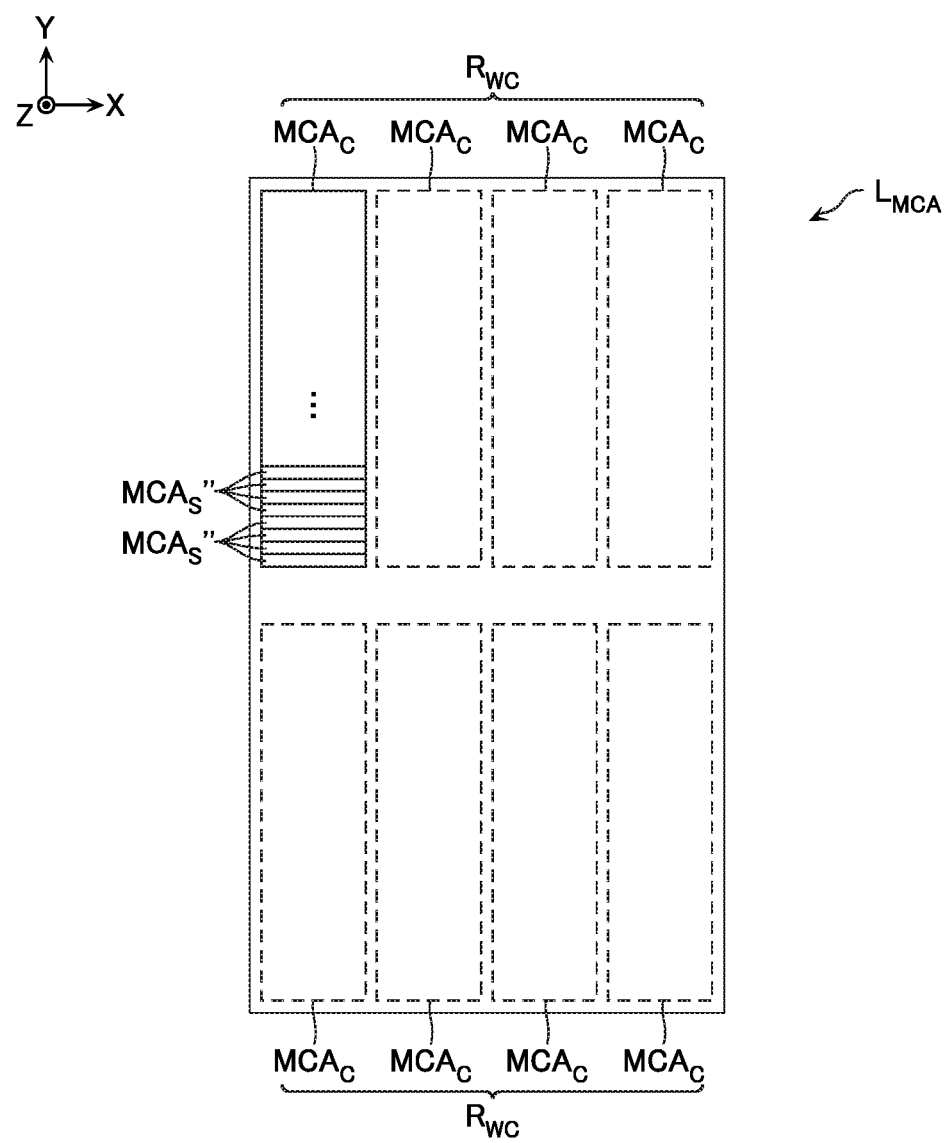
FIG. 29 is a schematic plan view showing configurations of a memory cell array layer $L_{MCA}$ of a semiconductor memory device according to a third embodiment.

FIG. 29 is a schematic plan view showing configurations of a memory cell array layer $L_{MCA}$ of a semiconductor memory device according to the third embodiment. The semiconductor memory device according to the third embodiment is basically configured similarly to that of the first embodiment. However, the semiconductor memory device according to the third embodiment comprises a sub array $MCA_S''$ instead of the sub array $MCA_S$. Moreover, the semiconductor memory device according to the third embodiment does not comprise the hookup region $R_{HU}$.

Figure 30:
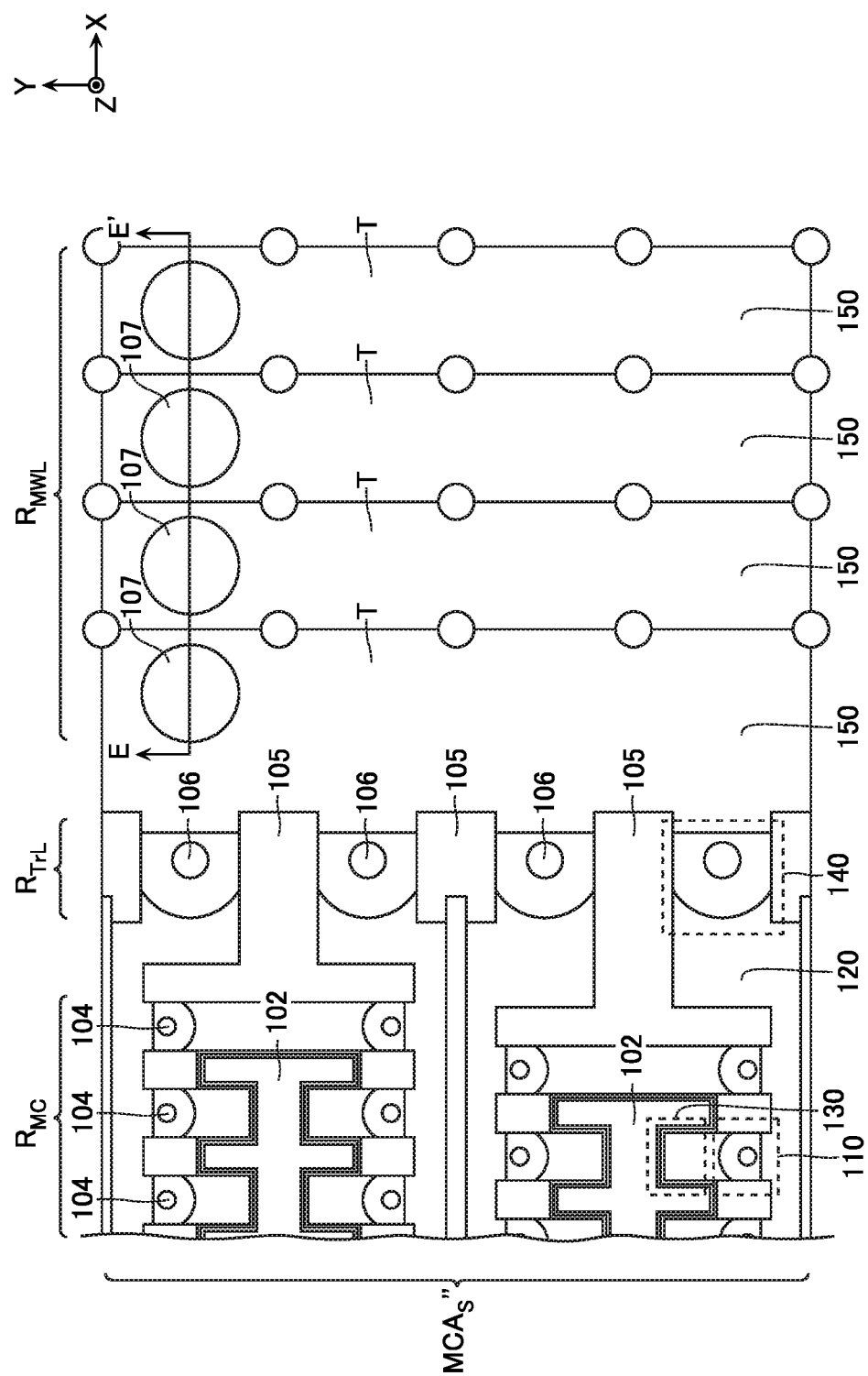
FIG. 30 is a schematic XY cross-sectional view showing some of configurations of a sub array $MCA_S''$.
Figure 31:
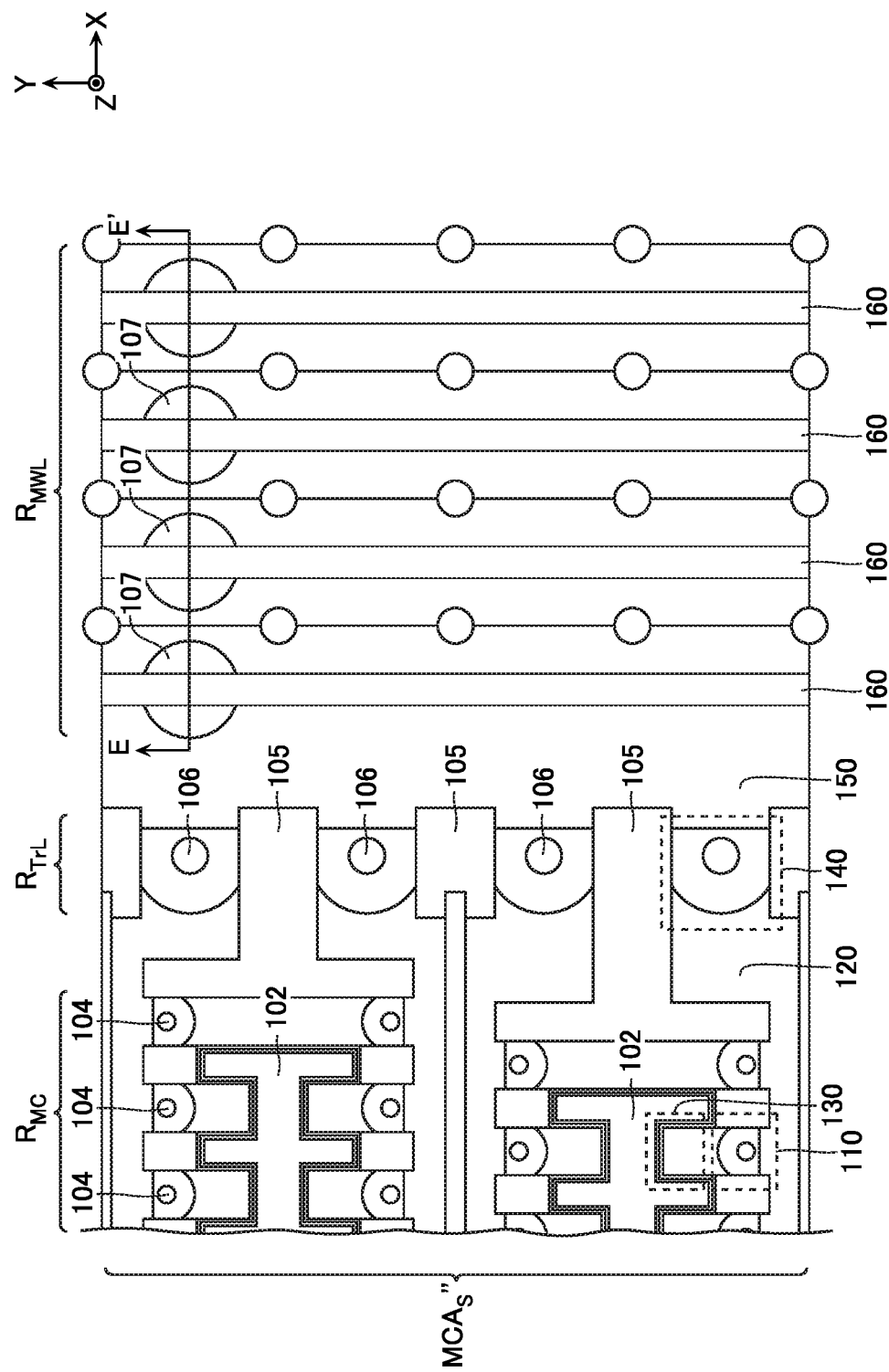
FIG. 31 is a schematic XY cross-sectional view showing some of configurations of the sub array $MCA_S''$.
Figure 32:
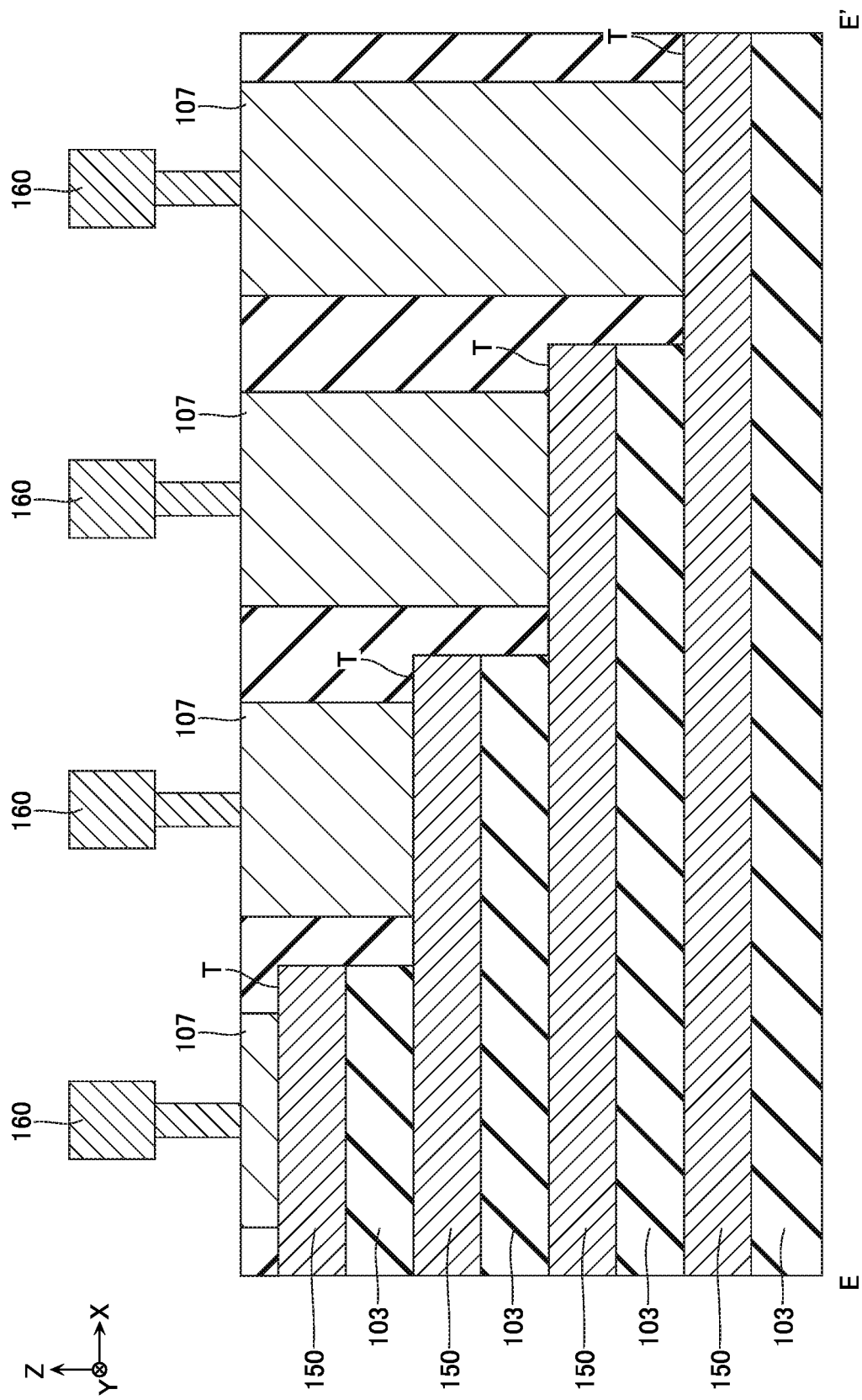
FIG. 32 is a schematic XZ cross-sectional view in which the configurations shown in FIGS. 30 and 31 have been cut along the line E-E' and viewed along a direction of the arrows.

FIGS. 30 and 31 are schematic XY cross-sectional views showing some of configurations of the sub array $MCA_S''$. Note that in FIGS. 30 and 31, some of configurations (the insulating layers 121, 151) are omitted. FIG. 32 is a schematic XZ cross-sectional view in which the configurations shown in FIGS. 30 and 31 have been cut along the line E-E' and viewed along a direction of the arrows.

As shown in FIG. 30, the sub array $MCA_S''$ is basically configured similarly to the sub array $MCA_S$.

However, in the main word line region $R_{MWL}$ of the sub array $MCA_S''$, the memory layers ML0-ML3 comprise the terrace portion T of the conductive layer 150.

Moreover, the main word line region $R_{MWL}$ of the sub array $MCA_S''$ is provided with a plurality of the contact electrodes 107 arranged in the X direction. As shown in FIG. 32, the contact electrode 107 extends in the Z direction and has its lower end connected to the terrace portion T of the conductive layer 150. Moreover, the plurality of contact electrodes 107 arranged in the X direction are respectively connected to conductive layers 150 provided at different height positions.

Moreover, as shown in FIG. 31, the main word line region $R_{MWL}$ of the sub array $MCA_S''$ is provided with a plurality of wirings 160 extending in the Y direction and arranged in the X direction. In the example illustrated, the contact electrodes 107 are respectively provided at positions overlapping single ones of the wirings 160 looking from the Z direction. As shown in FIG. 32, the contact electrodes 107 are electrically connected to these wirings 160.

In the third embodiment, the wiring 160 functions as the main word line MWL. Hence, in the third embodiment, the conductive layer 150 may extend in the Y direction across a plurality of the sub arrays $MCA_S''$ arranged in the Y direction, or may extend in the Y direction solely in a range of one sub array $MCA_S''$.

Other Embodiments

That concludes description of the semiconductor memory devices according to the first through third embodiments. However, the semiconductor memory devices according to these embodiments are merely exemplifications, and their specific configurations, operation, and so on, may be appropriately adjusted.

For example, in the semiconductor memory devices according to the first through third embodiments, the global bit line GBL was provided below the memory layers ML0-ML3. However, such a configuration is merely an exemplification, and specific configuration may be appropriately adjusted. For example, the global bit line GBL may be provided above the memory layers ML0-ML3.

Moreover, in the above description, there was adopted a structure of the kind where two of the transistors TrC adjacent in the Z direction, out of the plurality of transistors TrC arranged in the Z direction are adjacent via each other's channel region. Moreover, there was adopted a structure of the kind where two of the transistors TrL adjacent in the Z direction, out of the plurality of transistors TrL arranged in the Z direction are adjacent via each other's channel region. However, there may be adopted a structure of the kind where two of the transistors TrC adjacent in the Z direction, out of the plurality of transistors TrC arranged in the Z direction are adjacent via each other's gate electrode. Moreover, there may be adopted a structure of the kind where two of the transistors TrL adjacent in the Z direction, out of the plurality of transistors TrL arranged in the Z direction are adjacent via each other's gate electrode.

Moreover, in the above description, there was described an example where the capacitor CpC is adopted as the memory portion connected to the transistor structure 110. However, the memory portion need not be the capacitor CpC. For example, the memory portion may be one that includes a ferroelectric material, ferromagnetic material, chalcogen material of the likes of GeSbTe, or other material, and that utilizes characteristics of these materials to store data. For example, any of these materials may be included in an insulating layer between the electrodes forming the capacitor CpC, in any of the structures described above.

[Others]

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A semiconductor memory device comprising
a memory cell array,
the memory cell array comprising a plurality of sub array columns arranged in a first direction,
the plurality of sub array columns each comprising a plurality of sub arrays arranged in a second direction that intersects the first direction,
the plurality of sub arrays each comprising:
a plurality of memory portions arranged in a third direction, the third direction intersecting the first direction and the second direction;
a plurality of first semiconductor layers arranged in the third direction and electrically connected to the plurality of memory portions;
a plurality of first gate electrodes arranged in the third direction and respectively facing the plurality of first semiconductor layers;
a first wiring extending in the third direction and electrically connected to the plurality of first semiconductor layers;
a plurality of second wirings that are arranged in the third direction, extend in the first direction, and are connected to the plurality of first gate electrodes;
a plurality of second semiconductor layers that are arranged in the third direction and electrically connected to first end portions of the plurality of second wirings in the first direction;
a plurality of second gate electrodes arranged in the third direction and facing the plurality of second semiconductor layers; and
a third wiring extending in the third direction and electrically connected to the plurality of second semiconductor layers,
the plurality of sub array columns each comprising a plurality of fourth wirings that extend in the second direction across at least two of the plurality of sub arrays arranged in the second direction and are electrically connected to the second gate electrodes in the at least two of the plurality of sub arrays arranged in the second direction.

2. The semiconductor memory device according to claim 1, wherein
the plurality of fourth wirings are arranged in the third direction.

3. The semiconductor memory device according to claim 1, wherein
the plurality of fourth wirings are arranged in the first direction and are electrically connected to the plurality of second gate electrodes via contact electrodes extending in the third direction respectively.

4. The semiconductor memory device according to claim 1, wherein
a plurality of the third wirings are electrically commonly connected among at least two of the plurality of sub arrays arranged in the first direction.

5. The semiconductor memory device according to claim 1, wherein
the plurality of sub arrays each comprise:
a plurality of third semiconductor layers that are arranged in the third direction and electrically connected to second end portions of the plurality of second wirings in the first direction;
a plurality of third gate electrodes arranged in the third direction and facing the plurality of third semiconductor layers; and
a fifth wiring extending in the third direction and electrically connected to the plurality of third semiconductor layers, and
the plurality of sub array columns each comprise a plurality of sixth wirings that extend in the second direction across at least two of the plurality of sub arrays arranged in the second direction and that are electrically connected to the third gate electrodes in the at least two of the plurality of sub arrays arranged in the second direction.

6. The semiconductor memory device according to claim 5, wherein
the plurality of sixth wirings are arranged in the third direction.

7. The semiconductor memory device according to claim 5, wherein
the plurality of sixth wirings are arranged in the first direction and are electrically connected to the plurality of third gate electrodes via contact electrodes extending in the third direction respectively.

8. The semiconductor memory device according to claim 5, wherein
a plurality of the fifth wirings are electrically commonly connected among at least two of the plurality of sub arrays arranged in the first direction.

9. The semiconductor memory device according to claim 1, comprising:
a plurality of sense amplifier units provided correspondingly to the plurality of sub arrays; and
a plurality of signal supply lines provided correspondingly to the plurality of sub arrays,
wherein the plurality of sense amplifier units each comprise a plurality of amplifier circuits commonly connected to one of the plurality of signal supply lines, and
the plurality of amplifier circuits are configured to be capable of amplifying a signal of the first wiring in response to a signal of one of the plurality of signal supply lines.

10. The semiconductor memory device according to claim 1, wherein
at least one of the plurality of memory portions is a capacitor.

11. The semiconductor memory device according to claim 1, wherein
the plurality of first semiconductor layers respectively face surfaces on a first side and a second side opposite to the first side of the plurality of first gate electrodes in the third direction.

12. The semiconductor memory device according to claim 1, wherein
at least one of the plurality of second semiconductor layers faces surfaces on a first side and a second side opposite to the first side of at least one of the plurality of second gate electrodes in the third direction.

13. The semiconductor memory device according to claim 1, wherein
at least one of the plurality of first semiconductor layers and at least one of the plurality of second semiconductor layers each include an oxide semiconductor.

14. The semiconductor memory device according to claim 1, wherein
at least one of the plurality of first semiconductor layers and at least one of the plurality of second semiconductor layers each include: oxygen (O); indium (In); zinc (Zn); and at least one element selected from the group consisting of gallium (Ga) and aluminum (Al).

15. A semiconductor memory device comprising
a memory cell array,
the memory cell array comprising a plurality of sub array columns arranged in a first direction,
the plurality of sub array columns each comprising a plurality of sub arrays arranged in a second direction that intersects the first direction,
the plurality of sub arrays each comprising:
a plurality of memory portions arranged in a third direction, the third direction intersecting the first direction and the second direction;
a plurality of first semiconductor layers arranged in the third direction and electrically connected to the plurality of memory portions;
a plurality of first gate electrodes arranged in the third direction and respectively facing the plurality of first semiconductor layers;
a first wiring extending in the third direction and electrically connected to the plurality of first semiconductor layers;
a plurality of second wirings that are arranged in the third direction, extend in the first direction, and are connected to the plurality of first gate electrodes;
a plurality of second semiconductor layers that are arranged in the third direction and electrically connected to first end portions of the plurality of second wirings in the first direction;
a plurality of second gate electrodes arranged in the third direction and facing the plurality of second semiconductor layers; and
a third wiring extending in the third direction and electrically connected to the plurality of second semiconductor layers,
a plurality of the third wirings being electrically commonly connected among at least two of the plurality of sub arrays arranged in the first direction.

16. The semiconductor memory device according to claim 15, wherein
the plurality of sub arrays each comprise:
a plurality of third semiconductor layers that are arranged in the third direction and electrically connected to second end portions of the plurality of second wirings in the first direction;
a plurality of third gate electrodes arranged in the third direction and facing the plurality of third semiconductor layers; and
a fifth wiring extending in the third direction and electrically connected to the plurality of third semiconductor layers, and
a plurality of the fifth wirings are electrically commonly connected among at least two of the plurality of sub arrays arranged in the first direction.

17. The semiconductor memory device according to claim 15, comprising:
a plurality of sense amplifier units provided correspondingly to the plurality of sub arrays; and
a plurality of signal supply lines provided correspondingly to the plurality of sub arrays,
wherein the plurality of sense amplifier units each comprise a plurality of amplifier circuits commonly connected to one of the plurality of signal supply lines, and
the plurality of amplifier circuits are configured to be capable of amplifying a signal of the first wiring in response to a signal of one of the plurality of signal supply lines.

18. The semiconductor memory device according to claim 15, wherein
at least one of the plurality of memory portions is a capacitor.

19. The semiconductor memory device according to claim 15, wherein
the plurality of first semiconductor layers respectively face surfaces on a first side and a second side opposite to the first side of the plurality of first gate electrodes in the third direction.

20. The semiconductor memory device according to claim 15, wherein
at least one of the plurality of second semiconductor layers faces surfaces on a first side and a second side opposite to the first side of at least one of the plurality of second gate electrodes in the third direction.

21. The semiconductor memory device according to claim 1, wherein
the plurality of sub array columns each comprising a hookup region provided at an end portion of corresponding one of the plurality of sub array columns, and
the hookup region comprises a plurality of contact electrodes extending in the third direction and connected to the plurality of fourth wirings.

22. The semiconductor memory device according to claim 1, wherein
each of the plurality of second gate electrodes is continuous with a corresponding one of the plurality of fourth wirings.

23. The semiconductor memory device according to claim 5, wherein
each of the plurality of third gate electrodes is continuous with a corresponding one of the plurality of sixth wirings.

* * * * *